United States Patent
Taylor et al.

(10) Patent No.: US 6,630,935 B1
(45) Date of Patent: Oct. 7, 2003

(54) GEOMETRIC ENGINE INCLUDING A COMPUTATIONAL MODULE FOR USE IN A VIDEO GRAPHICS CONTROLLER

(75) Inventors: Ralph Clayton Taylor, Deland, FL (US); Michael Andrew Mang, Oviedo, FL (US); Michael Mantor, Orlando, FL (US)

(73) Assignee: ATI International, SRL, Barbados (KN)

( * ) Notice: Subject to any disclaimer, the term of this patent is extended or adjusted under 35 U.S.C. 154(b) by 0 days.

(21) Appl. No.: 09/556,474

(22) Filed: Apr. 21, 2000

(51) Int. Cl.$^7$ ............................................. G06T 15/00
(52) U.S. Cl. ...................... 345/522; 345/520; 345/531; 712/220; 709/102
(58) Field of Search ................ 345/502, 501, 345/505, 506, 520, 522, 531; 712/220, 221, 222, 223, 23, 24; 709/100, 102

(56) References Cited

U.S. PATENT DOCUMENTS

| 4,964,042 | A | | 10/1990 | Sterling et al. |
| 5,887,166 | A | * | 3/1999 | Mallick et al. ............. 709/102 |
| 5,909,544 | A | * | 6/1999 | Anderson, II et al. ...... 395/712 |
| 6,018,353 | A | | 1/2000 | Deering et al. |
| 6,091,506 | A | | 7/2000 | Payne et al. |
| 6,192,384 | B1 | * | 2/2001 | Dally et al. ................. 708/200 |
| 6,212,542 | B1 | | 4/2001 | Kahle et al. |
| 6,385,757 | B1 | * | 5/2002 | Gupta et al. .................. 716/1 |

* cited by examiner

*Primary Examiner*—Matthew C. Bella
*Assistant Examiner*—Mackly Monestime
(74) *Attorney, Agent, or Firm*—Vedder, Price, Kaufman & Kammholz, P.C.

(57) ABSTRACT

A computation module and/or geometric engine for use in a video graphics processing circuit includes memory, a computation engine, a plurality of thread controllers, and an arbitration module. The computation engine is operably coupled to perform an operation based on an operation code and to provide a corresponding result to the memory as indicated by the operation code. Each of the plurality of thread controllers manages at least one corresponding thread of a plurality of threads. The plurality of threads constitutes an application. The arbitration module is coupled to the plurality of thread controllers and utilizes an application specific prioritization scheme to provide operation codes from the plurality of thread controllers to the computation engine such that idle time of the computation engine is minimized. The prioritization scheme prioritizes certain threads over other threads such that the throughput through the computation module is maximized.

18 Claims, 15 Drawing Sheets

110

GEOMETRIC ENGINE INCLUDING A COMPUTATIONAL MODULE FOR USE IN A VIDEO GRAPHICS CONTROLLER

TECHNICAL FIELD OF THE INVENTION

This invention relates generally to video graphics processing and more particularly to video graphic processing involving the processing of geometric primitives.

BACKGROUND OF THE INVENTION

As is known, a conventional computing system includes a central processing unit, a chip set, system memory, a video graphics circuit, and a display. The video graphics circuit includes a raster engine and a frame buffer. The system memory includes geometric software and texture maps for processing video graphics data. The display may be a CRT display, LCD display or any other type of display.

To process video graphics data, the central processing unit executes geometric software to produce geometric primitives, which are often triangles. A plurality of triangles is used to generate an object for display. Each triangle is defined by a set of vertices, where each vertex is described by a set of attributes. The attributes for each vertex can include spatial coordinates, texture coordinates, color data, specular color data, etc. Upon receiving a geometric primitive, the raster engine of the video graphics circuit generates pixel data based on the attributes for one or more of the vertices of the primitive. The generation of pixel data may include texture mapping operations performed based on stored textures and texture coordinate data for each of the vertices of the primitive. The pixel data generated is blended with the current contents of the frame buffer such that the contribution of the primitive being rendered is included in the display frame. Once the raster engine has generated pixel data for an entire frame, or field, the pixel data is retrieved from the frame buffer and provided to the display.

Performing all of the primitive processing operations in software consumes a large amount of processing bandwidth that can limit the overall processing speed of the computing system in which the graphics processing is occurring. As graphics processing complexity increases, these limitations become more apparent.

Therefore, a need exists for a method and apparatus that provides parallel processing of graphics primitives with limited memory requirements such that a hardware geometry engine may be practically implemented.

BRIEF DESCRIPTIONS OF THE DRAWINGS

Figure 1:
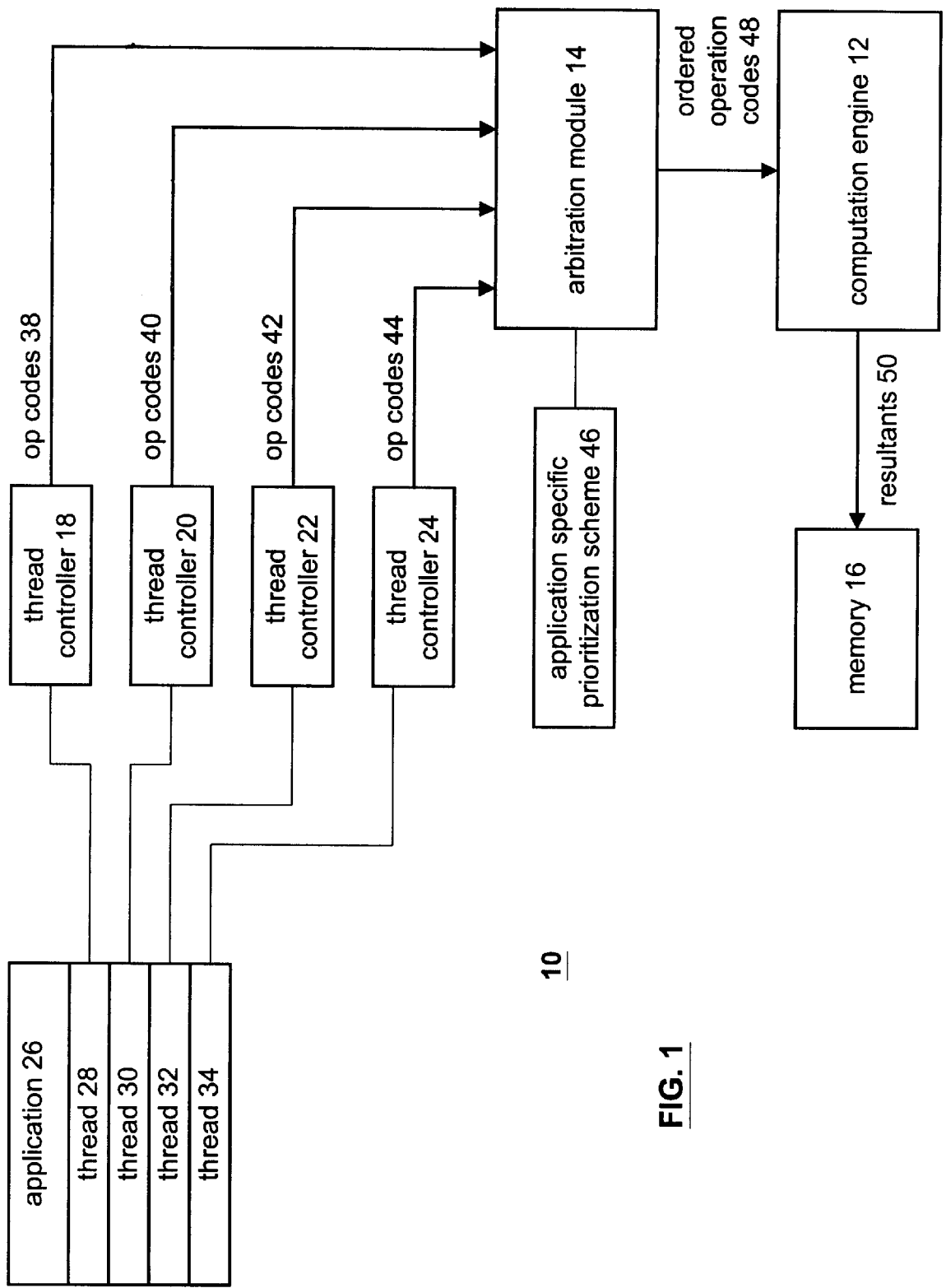
Figure 2:
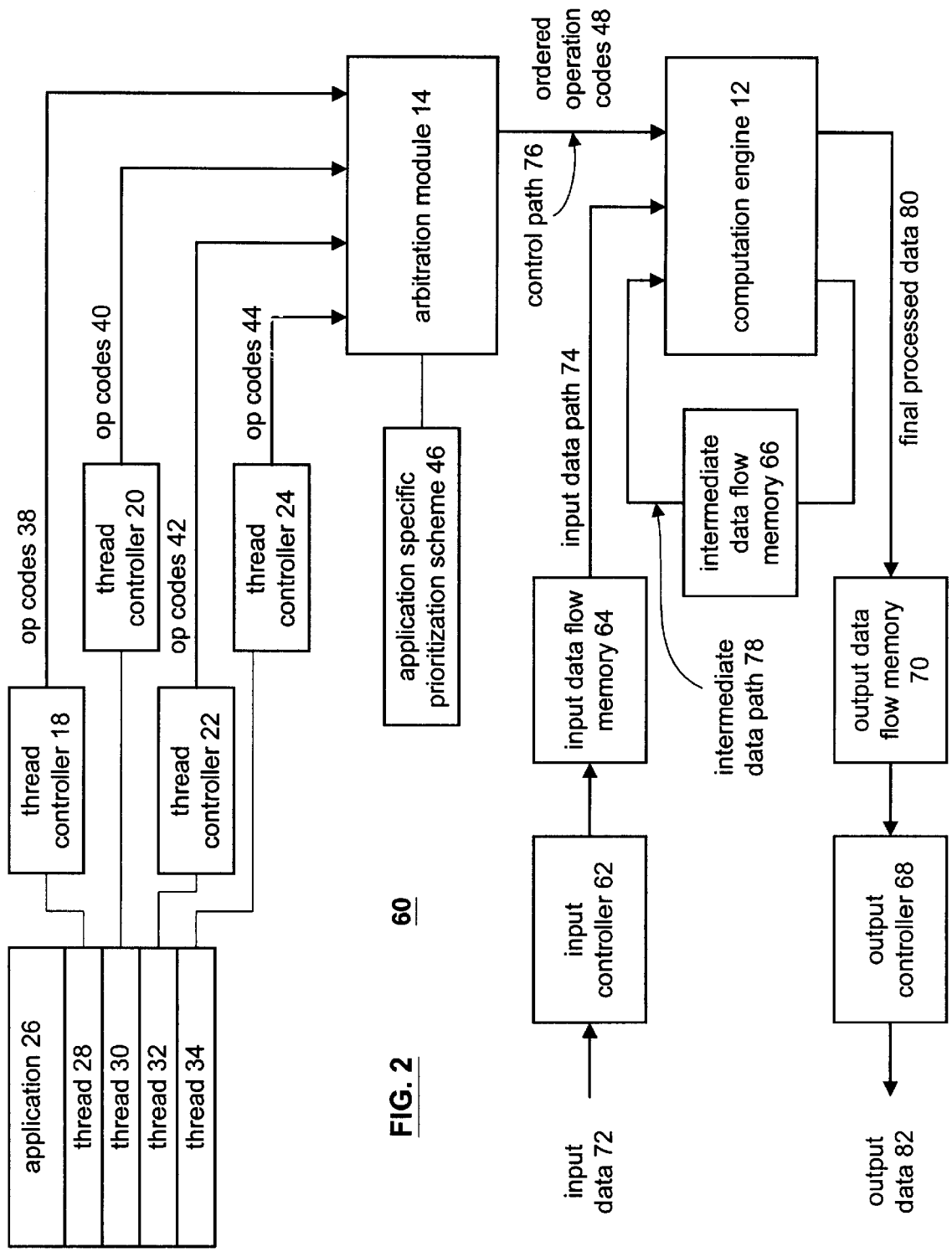
Figure 3:
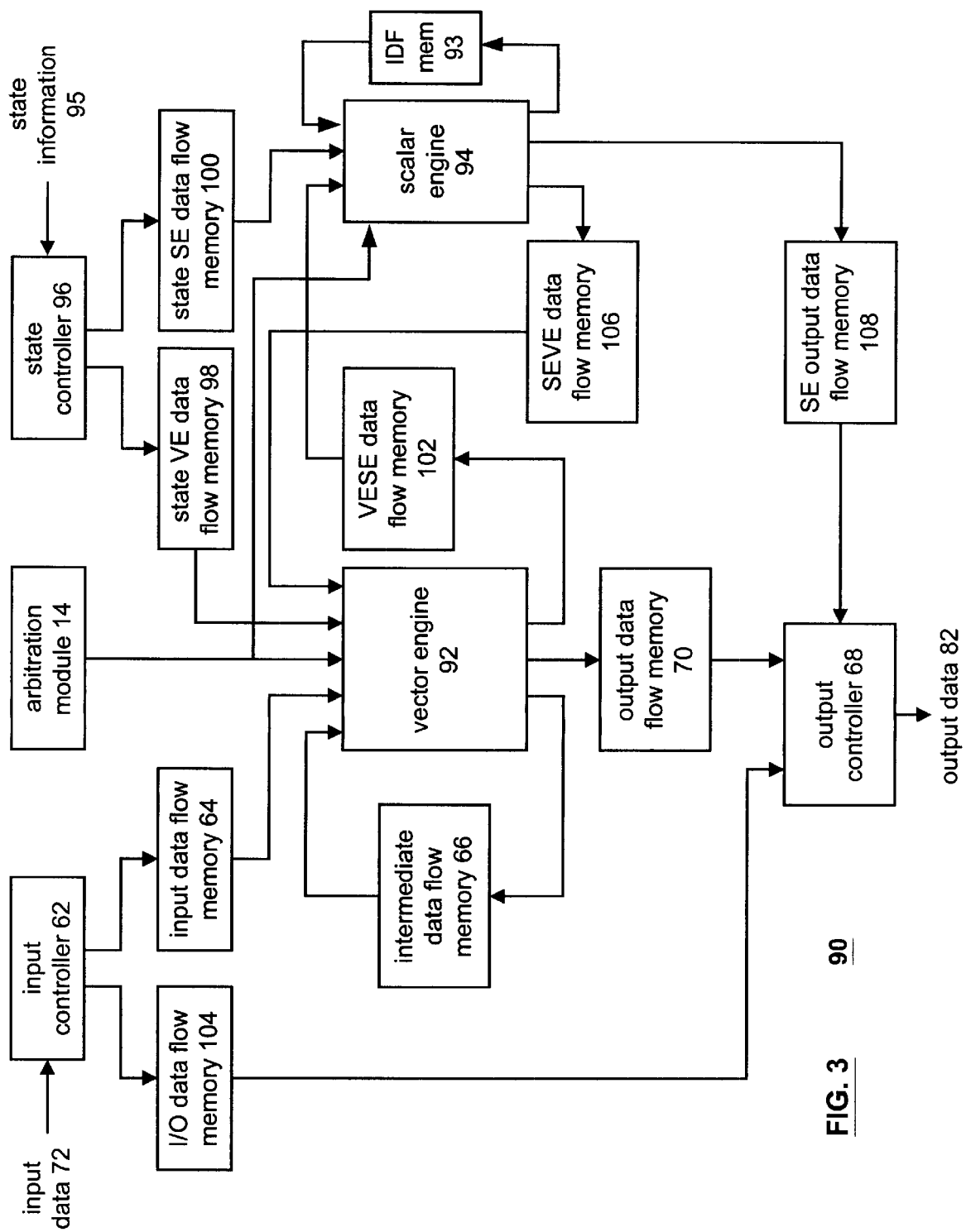
Figure 4:
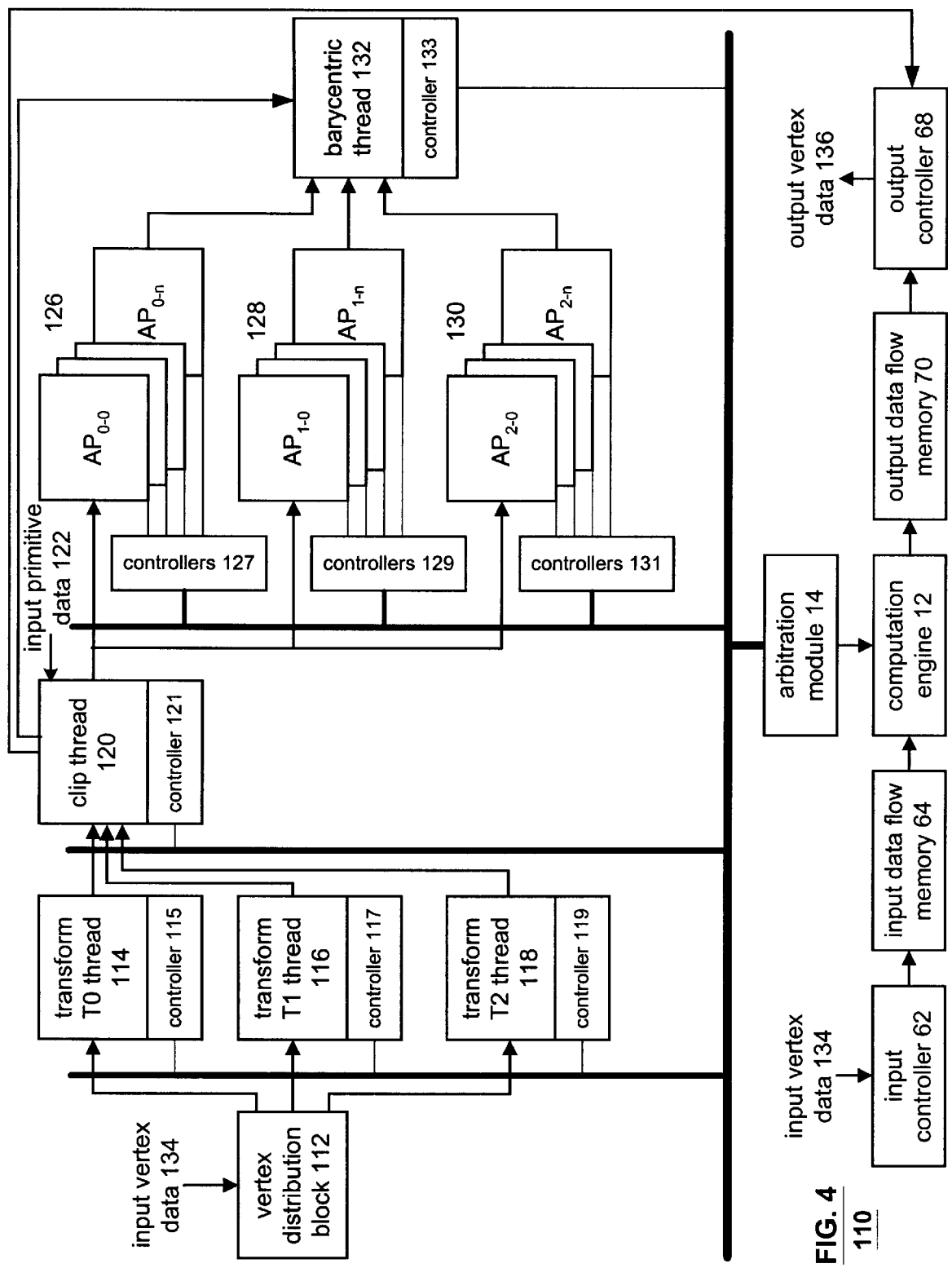
Figure 5:
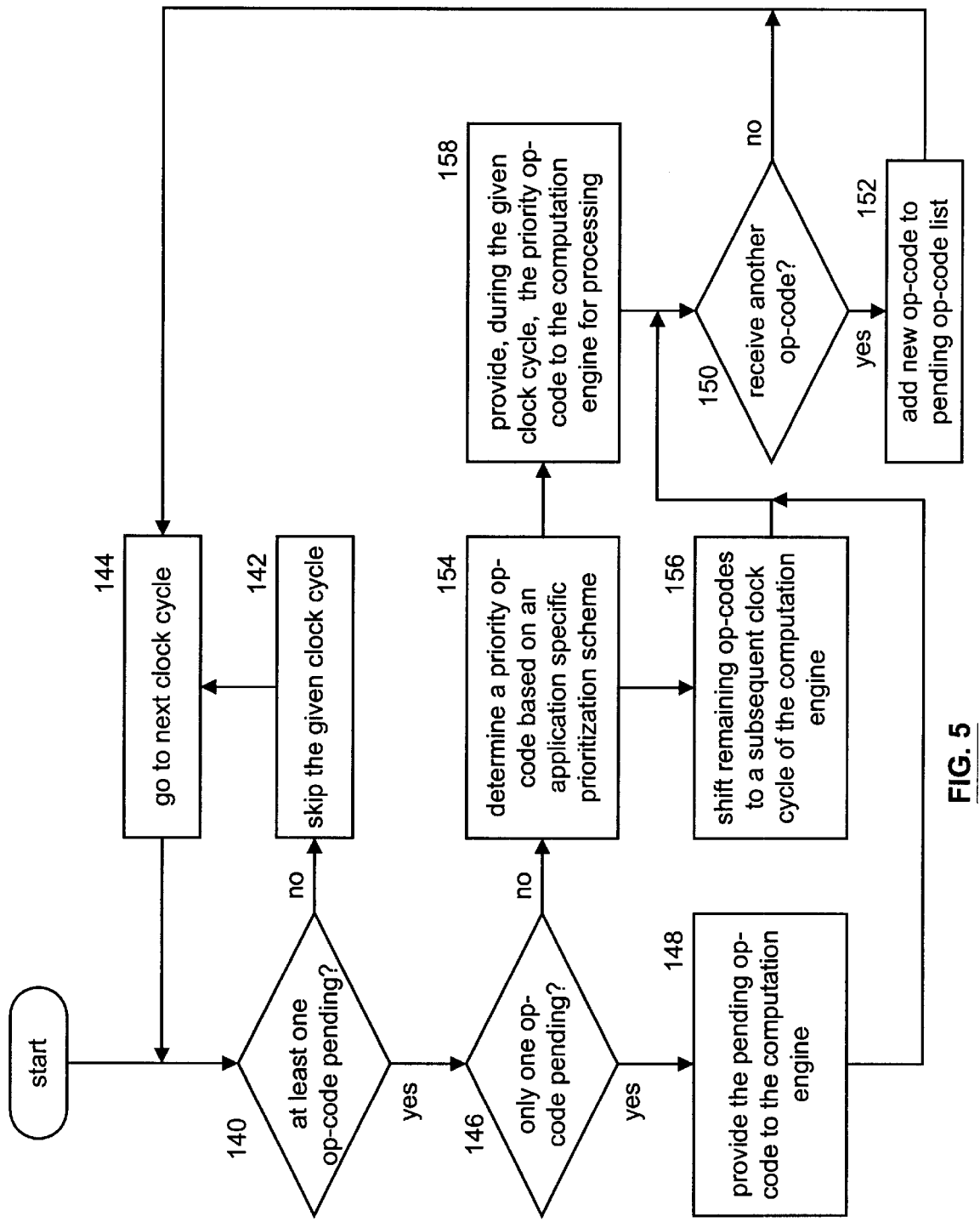
Figure 6:
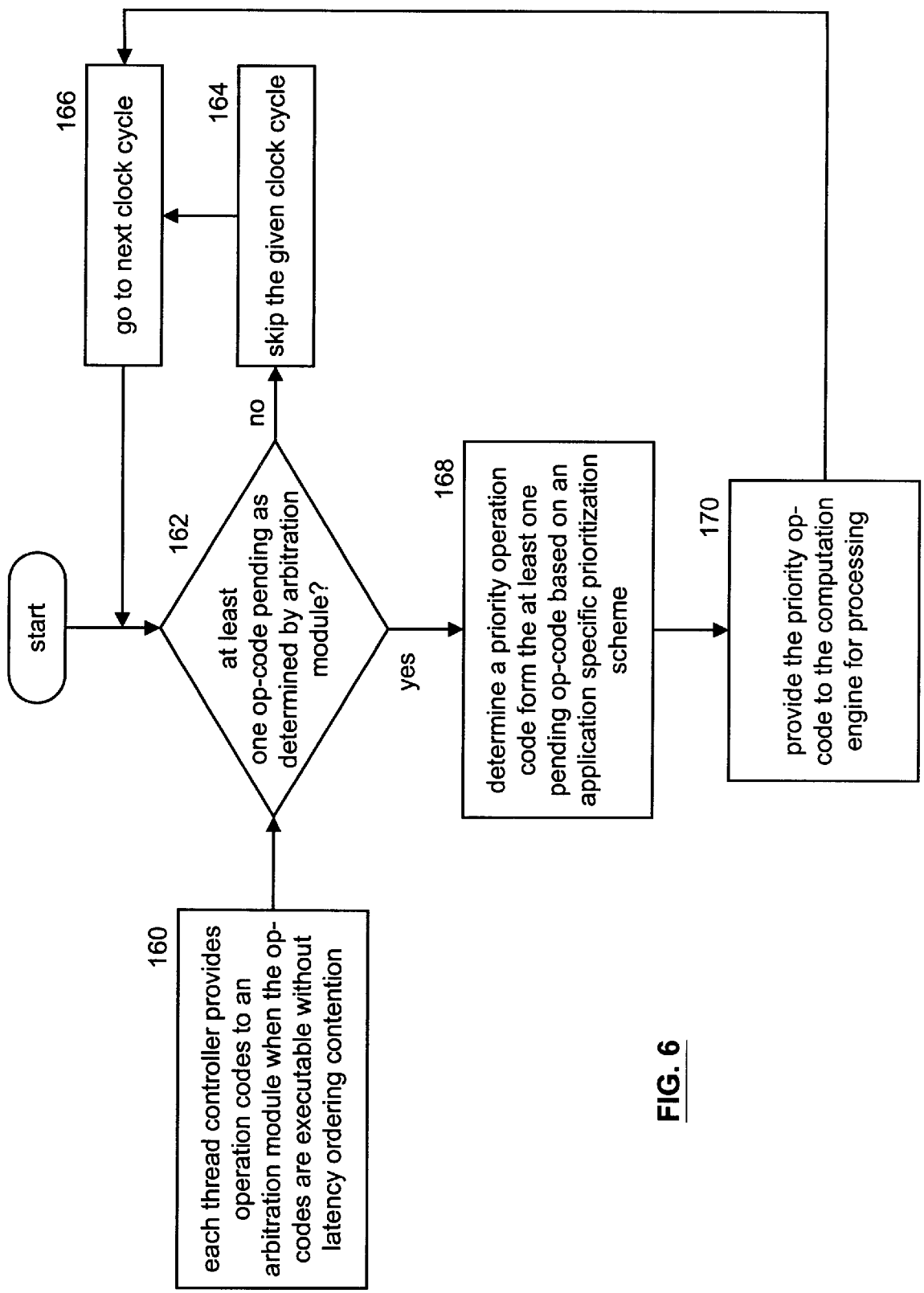
Figure 7:
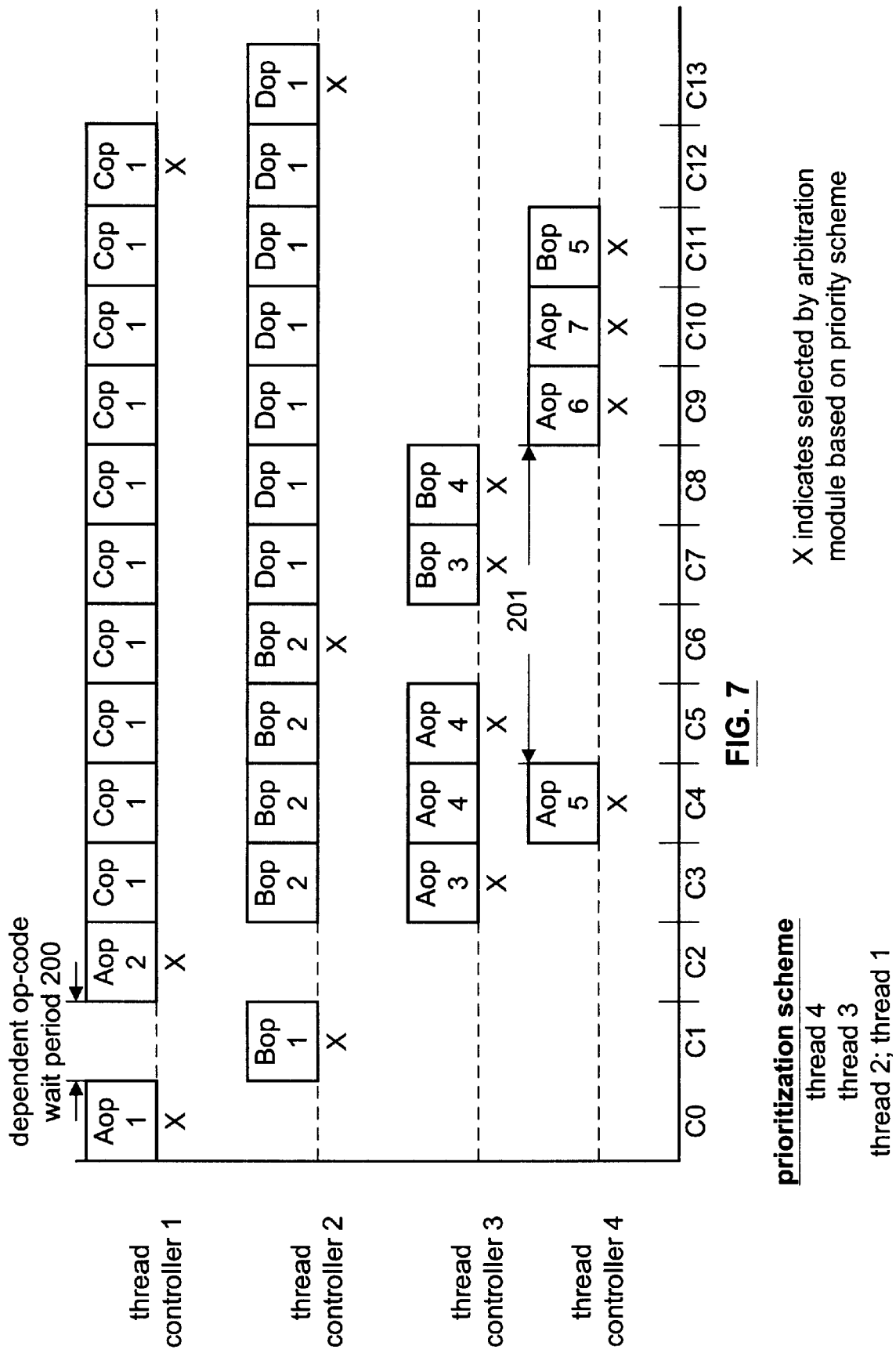
Figure 8:
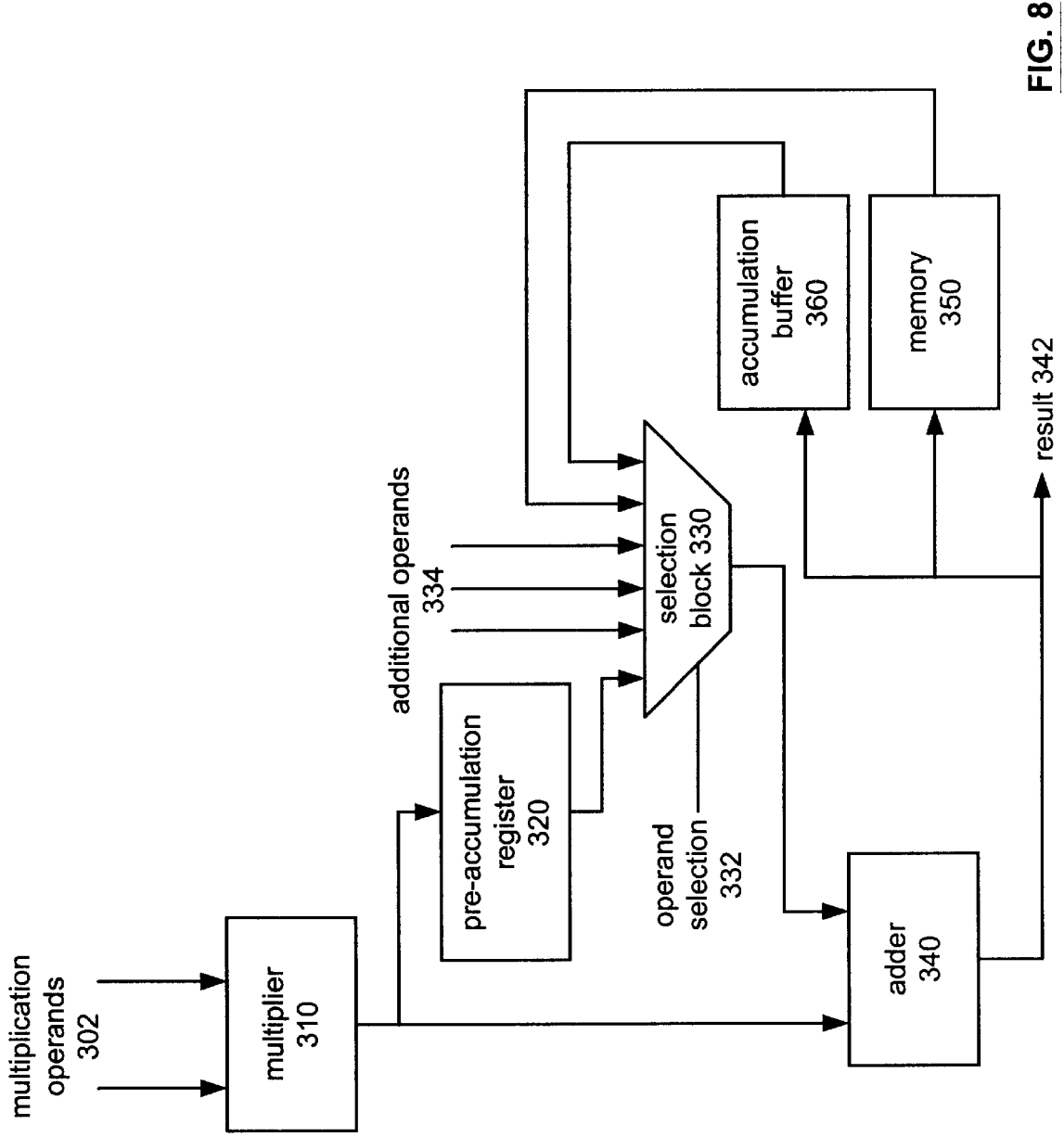
Figure 9:
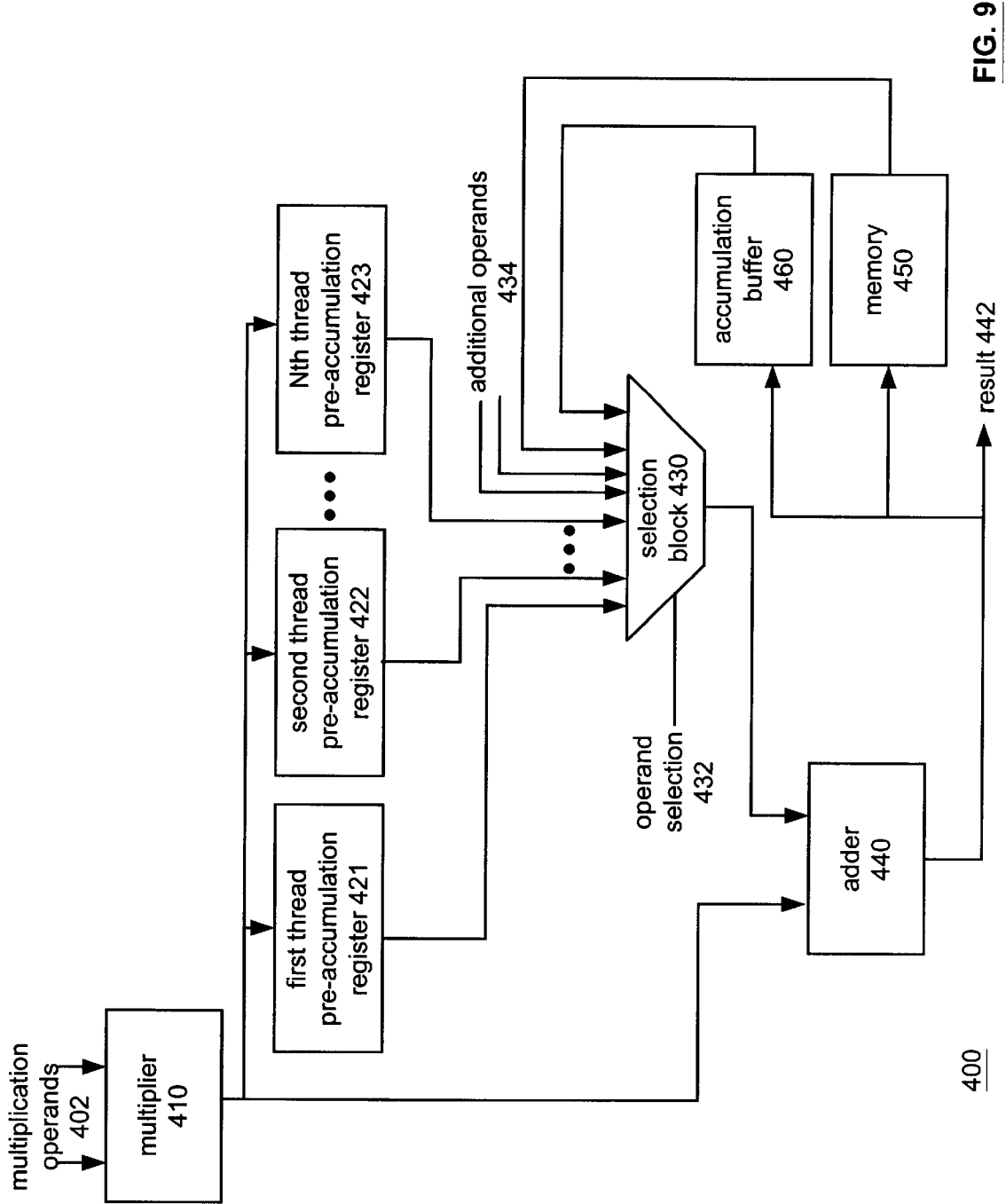
Figure 10:
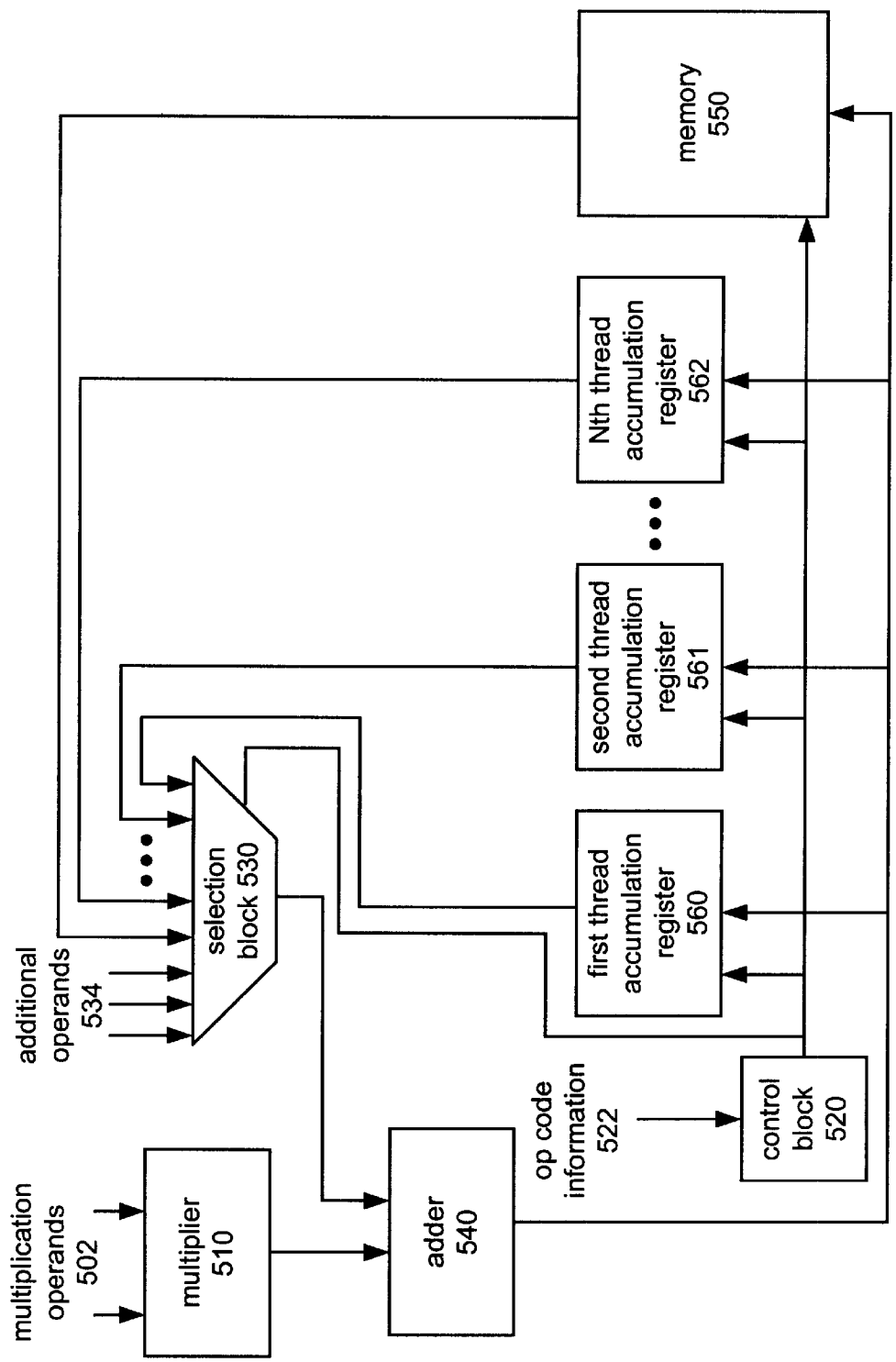
Figure 11:
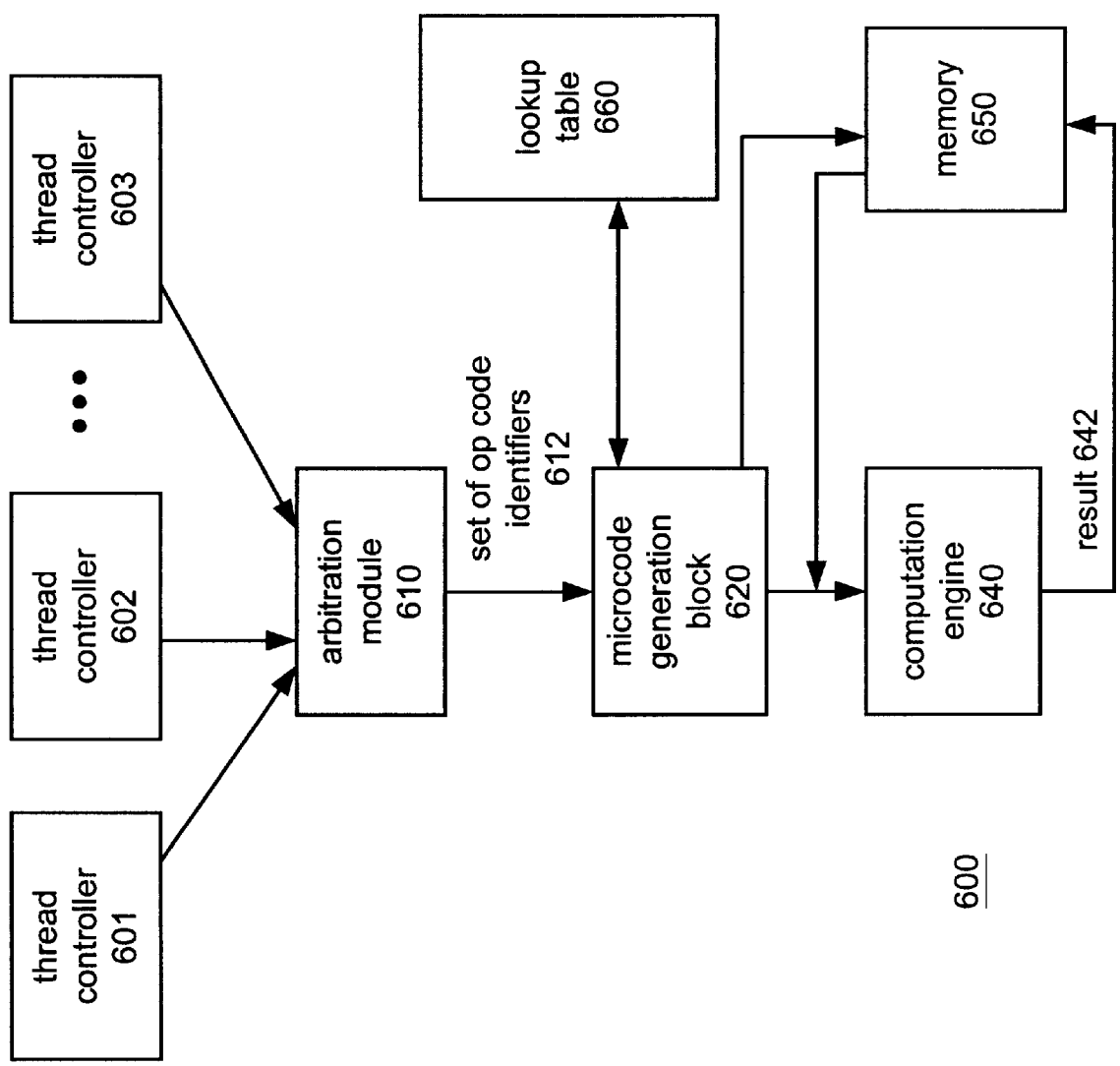
Figure 12:
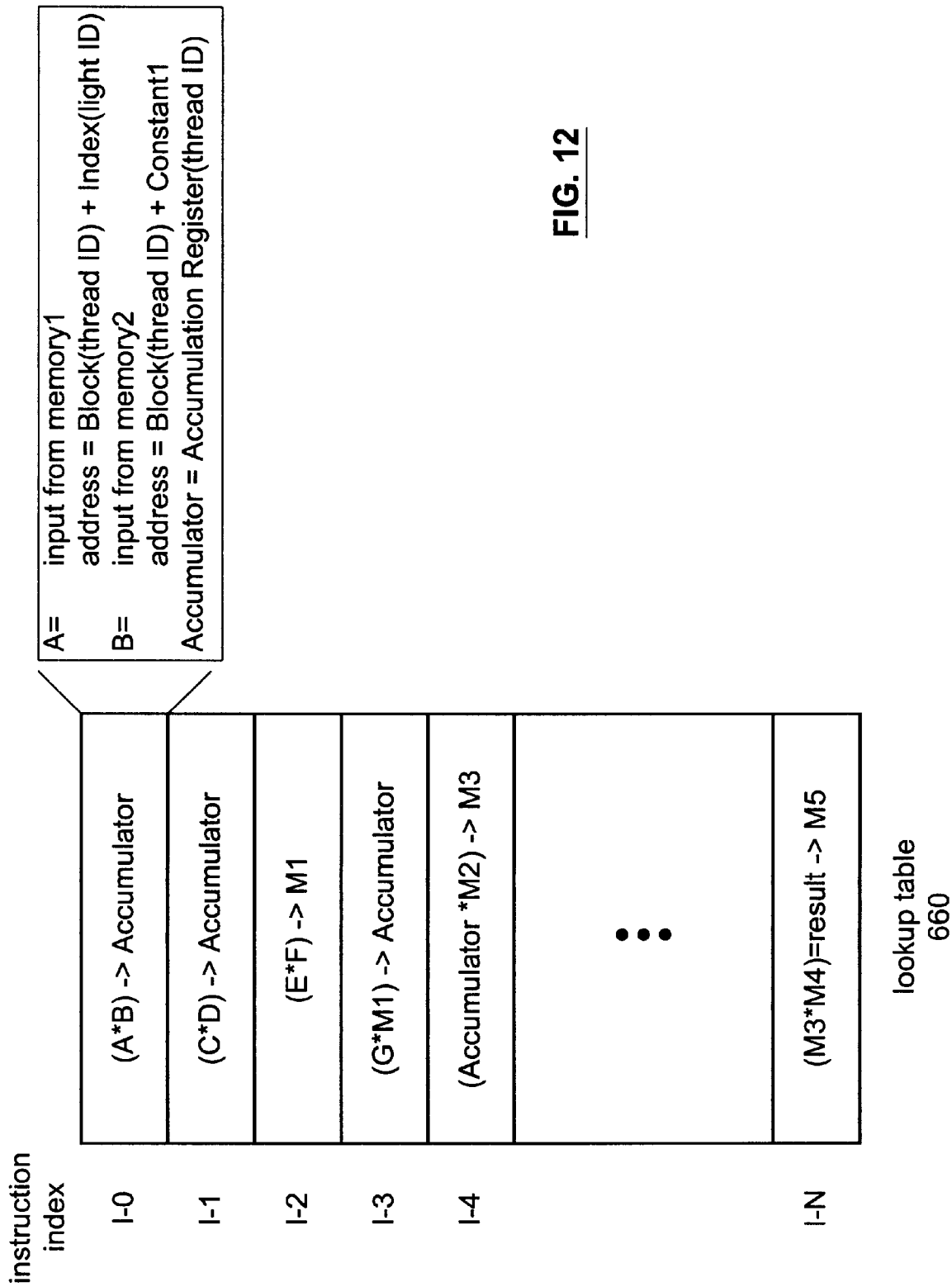
Figure 13:
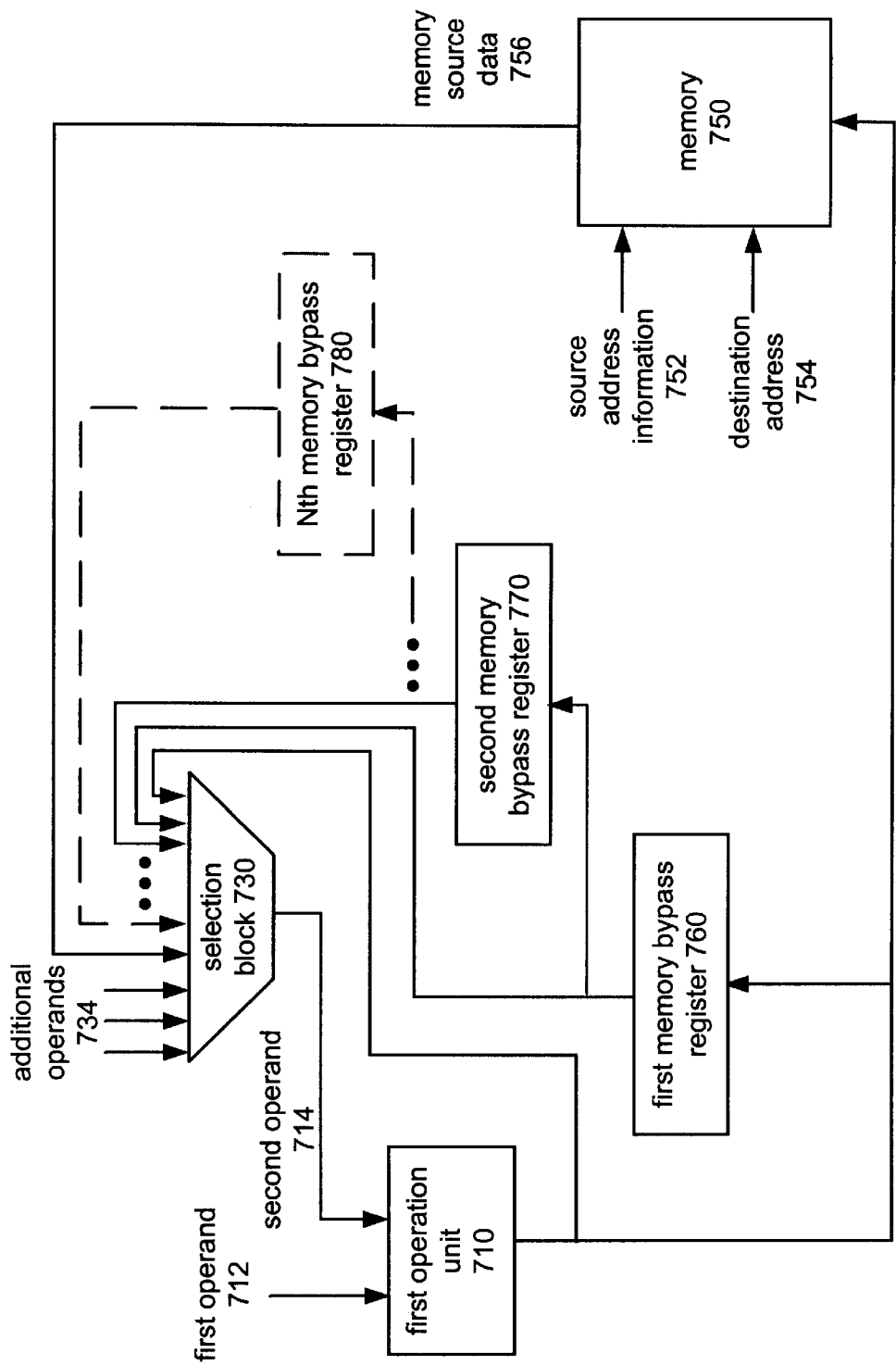
Figure 14:
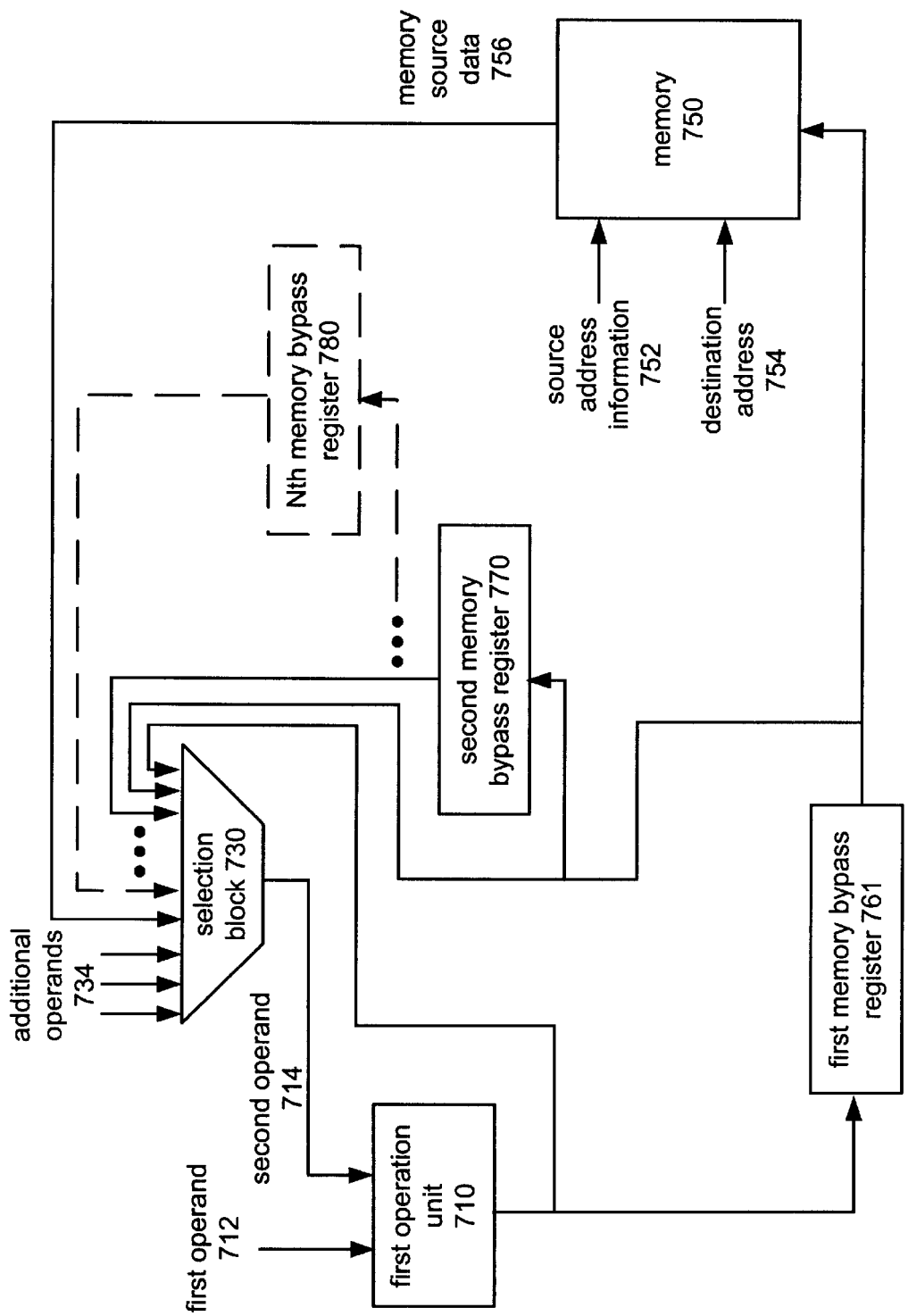
Figure 15:
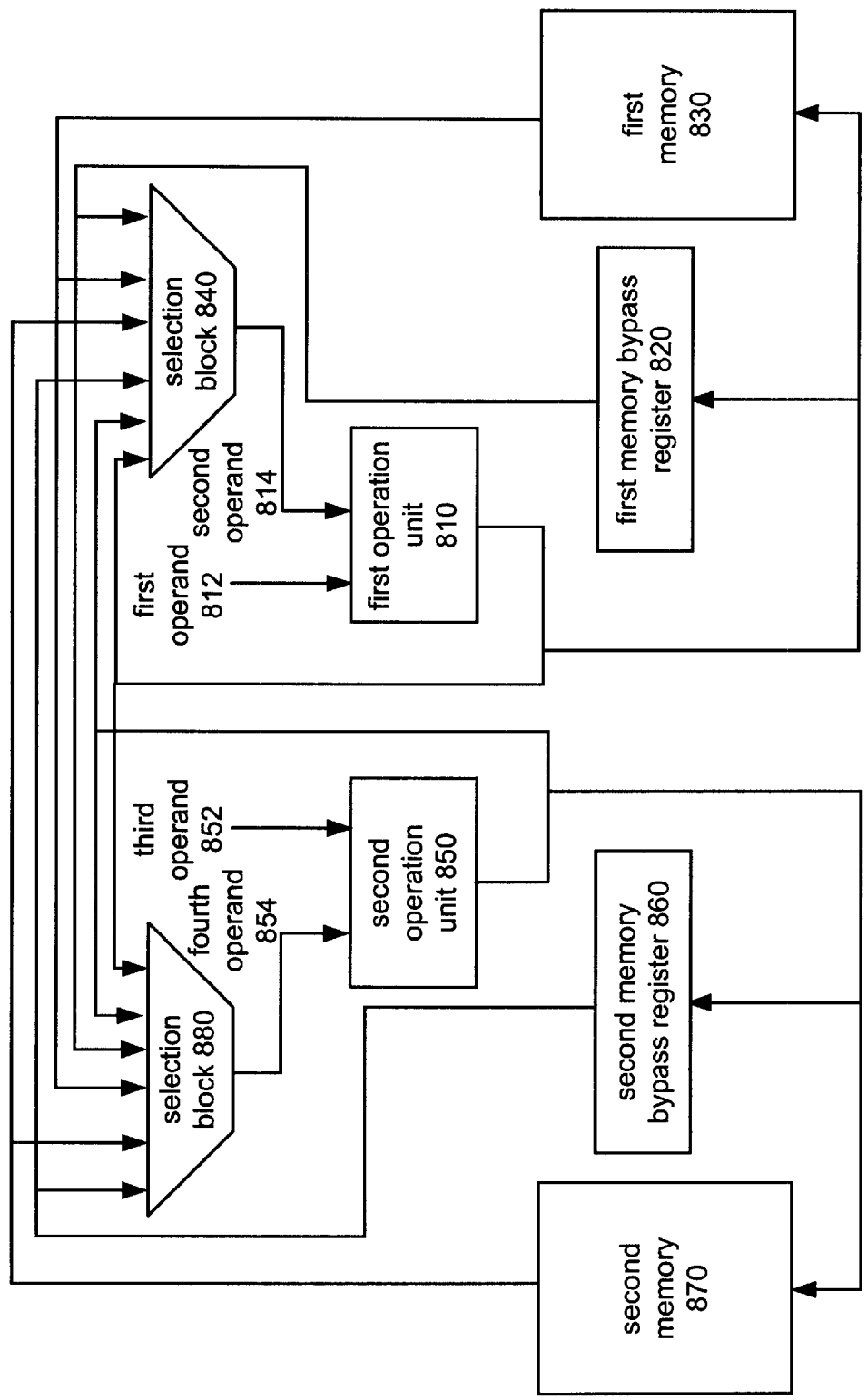

FIG. 1 includes an illustration of a block diagram of geometric engine in accordance with the present invention;

FIG. 2 includes an illustration of a more detailed block diagram of a geometric engine in accordance with the present invention;

FIG. 3 includes an illustration of another block diagram of a geometric engine in accordance with the present invention;

FIG. 4 includes an illustration of yet another block diagram of a computation engine in accordance with the present invention;

FIG. 5 includes an illustration of a flow diagram of a method for processing arbitration in accordance with the present invention;

FIG. 6 includes an illustration of a flow diagram of an alternate method for processing arbitration in accordance with the present invention;

FIG. 7 includes a graphical representation of processing arbitration in accordance with the present invention;

FIG. 8 includes an illustration of a block diagram of a computation circuit that includes a pre-accumulation register in accordance with a particular embodiment of the present invention;

FIG. 9 includes an illustration of a block diagram of a computation circuit that includes a plurality of pre-accumulation registers for supporting a plurality of processing threads in accordance with a particular embodiment of the present invention;

FIG. 10 includes an illustration of a block diagram of a computation circuit that includes a plurality of accumulation registers for supporting a plurality of processing threads in accordance with a particular embodiment of the present invention;

FIG. 11 includes an illustration of a block diagram of a circuit that provides shared microcode to a plurality of thread controllers in accordance with a particular embodiment of the present invention;

FIG. 12 includes a graphical representation of a lookup table of FIG. 11 storing shared microcode in accordance with a particular embodiment of the present invention;

FIG. 13 includes an illustration of a block diagram of a computation engine that includes a plurality of memory bypass registers in accordance with a particular embodiment of the present invention;

FIG. 14 includes an illustration of a block diagram of a computation engine that includes a plurality of memory bypass registers in an alternate configuration in accordance with a particular embodiment of the present invention; and FIG. 15 includes an illustration of a block diagram of a computation engine that includes a plurality of memory bypass registers supporting a plurality of operation units and a plurality of memories in accordance with a particular embodiment of the present invention.

DETAILED DESCRIPTION OF A PREFERRED EMBODIMENT

Generally, the present invention provides a computation module and/or geometric engine for use in a video graphics processing circuit. The computation module includes memory, a computation engine, a plurality of thread controllers, and an arbitration module. The computation engine is operably coupled to perform an operation based on an operation code and to provide a corresponding result to the memory as indicated by the operation code. Each of the plurality of thread controllers manages at least one corresponding thread of a plurality of threads. The plurality of threads constitutes an application. The arbitration module is coupled to the plurality of thread controllers and utilizes an application specific prioritization scheme to provide operation codes from the plurality of thread controllers to the computation engine such that idle time of the computation engine is minimized. The prioritization scheme prioritizes certain threads over other threads such that the throughput through the computation module is maximized.

The present invention can be more fully described with reference to FIGS. 1 through 15. FIG. 1 illustrates a computation module 10 that may be mused in a geometric engine of a video graphics circuit. The computation module includes a computation engine 12, an arbitration module 14, memory 16, and a plurality of thread controllers 18–24. Each of the plurality of thread controllers 18–24 corresponds to a particular thread 28–34 of an application 26. The application 26 may be an application corresponding to processing geometric primitives for use in a video graphics circuit. Such an application includes threads for determining the vertices and associated attributes of primitives to be rendered, performing transform operations on the vertices, performing clipping operations on the primitives, determining lighting effects, and determining texture coordinate values. The details of the particular threads 28–36 of application 26 for a geometric engine are discussed in greater detail with reference to FIG. 4 below.

Each of the thread controllers 18–24 manages a corresponding thread and provides operation codes (op codes) 38–44 to the arbitration module 14. Each thread is a sequence of operation codes that are executed under the control of a corresponding thread controller. Although the threads 28–34 are shown to be separate from the thread controllers 18–24, each thread may simply be a sequence of operation codes or representations of the operation codes stored within a corresponding thread controller. Each operation code includes a thread identifier that identifies the particular thread controller that issued the operation code, a type of operation to be performed, a first source address, a second source address, and a destination address. When an operation code is provided to the computation engine 12, the computation engine 12 executes the operation using data stored at the first and second source addresses and stores the result using the destination address. The source addresses and destination address may be predetermined based on the particular operation of the particular thread being executed. As such, memory contention is eliminated, and the need for a memory controller is also eliminated. The elimination of memory contention is discussed in greater detail with reference to FIG. 3 below.

The thread controllers 18–24 each only release operation codes 38–44 when the operation codes can be executed without any potential for delay in waiting for the results of previously issued operation codes. For example, when an operation code is dependent on the results of a previously issued operation code, the thread controller will not release the dependant operation code until a certain amount of time has passed corresponding to the latency associated with executing the operation code that produces the data required by the dependent operation code. Preferably, each thread controller only issues one operation code at a time. The controlled release of operation codes by the thread controllers such that latency issues are avoided is discussed in greater detail with reference to FIG. 7 below.

The arbitration module 14 receives the operation codes 38–44 from the thread controllers 18–24 and, based on an application specific prioritization scheme 46, orders the operation codes to produce ordered operation codes 48. The ordered operation codes 48 are provided to the computation engine 12 in an ordered serial manner for execution. The ordered operation codes 48 are provided to the computation engine at the processing rate of the computation engine 12 such that the computation engine 12 is fully utilized (i.e. the pipeline included in the computation engine 12 is kept full). The application specific prioritization scheme 46 is dependent on the application 26. Typically, the computation module 10 is dedicated to performing a very specific function such as processing geometric primitives for graphics processing. Since the processing of geometric primitives is very structured, the application specific prioritization scheme 46 may prioritize operations in a back-to-front manner that ensures that processing that is nearing completion is prioritized over processing that is just beginning. Prioritizing the final steps to produce results passed to downstream circuitry may help to ensure that the resources in the pipeline of the computation engine 12 are efficiently utilized and a regular production rate of results can be maintained.

The computation engine 12, which is discussed in greater detail with reference to FIGS. 3 and 8–15 below, receives the ordered operation codes 48 and generates resultants 50 therefrom. The ordered operation codes 48 are received in a synchronized manner corresponding to the operating rate of the computation engine 12. The objective of the arbitration module 14 is to order the operation codes 48 such that the computation engine 12 runs at capacity (i.e. the pipeline within the computation engine is always full and the resources in the computation engine are efficiently utilized). Thus, for every operation cycle of the computation engine 12, the arbitration module 14 attempts to provide it with an operation code for execution. The resultants 50 produced by the computation engine 12 are stored in the memory 16 at predetermined locations that may be based on a destination address determined from attributes of the operation codes executed (e.g. thread identity, operation performed, etc.). By providing a dedicated memory for each data path within the computation module, memory contention is eliminated. Such segmentation of system memory is described in additional detail with respect to FIG. 3 below. As stated above, each operation code includes the corresponding source and destination addresses that it requires for execution, and the utilization of such predetermined locations eliminates the need for a memory controller that maintains the location of various pieces of data.

FIG. 2 illustrates a block diagram of an alternate computation module 60 that may be used in a geometric engine of a video graphics circuit. The computation module 60 includes the computation engine 12, the arbitration module 14, and the plurality of thread controllers 18–24. In addition, the computation module 60 includes an input controller 62, an output controller 68, and a plurality of data flow memory devices 64, 66, and 70. Each thread controller of the plurality of thread controllers of 18–24 is associated with a particular thread of the plurality of threads 28–34 of the application 26 as described with reference to FIG. 1 above. In addition, each of the thread controllers generates operation codes 38–44 as described with reference to FIG. 1 above. The arbitration module 14 generates ordered operation codes 48 utilizing the application specific prioritization scheme 46 as described with reference to FIG. 1 above.

The operation codes 38–44 include source and destination addresses. Thus, when the computation engine 12 is executing a particular operation code, it derives the source addresses and destination address required for execution of the particular operation code from the particular operation code. In general, the computation engine 12 executes each operation code using input data either received along the input data path 74 or along the intermediate data path 78. The computation engine 12 stores the results produced by the execution of each operation code in the intermediate data flow memory 66 or in the output data flow memory 70. Because in some embodiments each memory is only able to provide one operand during each clock cycle, multiple memory structures may be included along some data paths to allow two operands to be taken from a single data path for an operation. For example, a first result may be stored in first data path memory and a second result in a second data path memory where both the first and second data path memories correspond to the same data path. A subsequent operation could then use the first and second results together as operands as they are located in different memories.

The input data 72 may correspond to the data generated by the central processing unit when performing a drawing application or any application that requires information to be rendered utilizing a three-dimensional video graphics processor. The input controller 62 receives the input data 72 and stores it in a corresponding location with the input data flow memory 64. The location in the input data flow memory 64 at which the input data 72 is stored may be based on the input data 72 itself. In other words, the predetermined location within the input data flow memory 64 at which the input data 72 is stored may be based on particular elements included in the input data 72. For example, the input data 72 may correspond to variables that are constantly changing for each primitive processed (e.g. vertex information), or state information that may be used in the processing of a number of primitives (e.g. user defined clipping planes). By determining where to store the input data based on the type of information included in the input data, the entire system may be aware of where certain types of information are present within each of the memory structures included in the system. When the input data 72 includes vertex data, the vertices are generally defined based on attributes such as X, Y, Z, W coordinates, normal vectors, texture coordinates, color information, etc.

Intermediate data stored in the intermediate data flow memory 66 may also be provided to the computation engine for processing. Typically, the intermediate data presented along the intermediate data path 78 is the result of a previous operation performed by the computation engine 12 that is to be utilized in a subsequent operation (i.e. it is non-final data). For example, an accumulated value associated with a plurality of multiply and accumulate operations may be stored in the intermediate memory, where for each subsequent accumulation operation, the current accumulated value is provided to the computation engine such that the new product generated by the multiply operation can be added to the current accumulated value to produce a new accumulated value.

The computation engine 12 receives the input data for an operation via at least one of the input data path 74 and the intermediate data path 78. Upon receiving the input data corresponding to a particular operation code 48 to be executed, the computation engine 12 outputs the result of the operation to at least one of the intermediate data flow memory 66 and the output data flow memory 70. The particular destination for the resultant, or result of the operation, is based on the operation code executed. For example, if the operation code corresponds to a final processing step (specified by a final operation code) for a geometric primitive, the output of the computation engine may be a final processed data element 80 that is stored in the output data flow memory 70. Alternatively, if the resultant produced by the computation engine 12 is an intermediate resultant (e.g., a clipping distance or transform result), the resultant is stored in the intermediate data flow of memory 66. Note that regardless of whether the resultant produced by the computation engine 12 is stored in the intermediate data flow memory 66 or the output data flow memory 70, the operation code executed by the computation engine includes the destination address for the given resultant. By having dedicated memory devices for the various data flow paths within the computation module 60, memory contention within the computation module 60 is eliminated, and the need for a memory controller that maintains the location of specific data with respect to the memory devices is also eliminated.

FIG. 3 illustrates a block diagram of another computation module 90 that may be used in a geometric engine of a video graphics circuit. The computation module 90 includes a vector engine 92, a scalar engine 94, the input controller 62, the output controller 68, a state controller 96, the arbitration module 14, and a plurality of data flow memory devices 64, 66, 70, 98, 100, 102, 104, 106, and 108. The vector engine 92 and the scalar engine 94 may constitute the computation engine 12 of FIGS. 1 and 2. In general, the vector engine 92 processes vector information for the attributes of a given vertex of a primitive. The vector engine 92 is designed to perform particular types of mathematical operations in an efficient manner. Such mathematical operations include vector dot products operations, vector addition operations, vector subtraction operations, vector multiply and accumulate operations, and vector multiplication operations. The vector dot products generally performed by the vector engine correspond to $(X_0 \times X_1)+(Y_0 \times Y_1)+(Z_0 \times Z_1)+(W_0 \times W_1)$.

The scalar engine 94 may be generally dedicated to performing lighting effect functions. The scalar engine 94 is capable of performing a variety of scalar operations such as clip code generation, clip distance calculation, inverse functions, $X^Y$ functions, $e_x$ functions, $1/X$ functions, and the inverse of the square root of X functions. Clip codes and clip distances are described in detail in a co-pending patent application entitled "Method and Apparatus for Clipping an Object-Element in Accordance with a Clipped Volume", which has a Ser. No. of 09/496,732 and a filing date of Feb. 2, 2000. The $1/X$ function is may be used for determining a range for lighting effects, the $X^Y$ function may be used for specular lighting effects, the $e^x$ function may be used for fogging effects, and the inverse of the square root of X may be used in normalized vector calculations. In addition, the scalar engine 94 may support state functions as defined in the OpenGL specification.

The input controller 62 receives the input data 72 and, based on the particular elements of the input data 72, stores the input data in the I/O data flow memory 104 or the input data flow memory 64. The input data 72 is stored in the input data flow memory 64 if the data requires processing. If the input data 72 is flow-through data (i.e. the input data does not require processing by the vector engine 92 or the scalar engine 94), the information will be stored in the input/output (I/O) data flow memory 104. Such flow-through input data may correspond to texture information, or other information that does not require three dimensional video graphics processing.

The vector engine 92 produces results based on the ordered operation codes received from the arbitration module 14. The results produced may be stored in the intermediate data flow memory 66, the output flow data memory 70 or the vector engine-scalar engine (VESE) data flow memory 102. The VESE data flow memory 102 represents an inter-engine data path that allows the results of the one computation engine (the vector engine 92) to be provided to another computation engine (the scalar engine 94). The direction of results to the intermediate data flow memory 66 and the output data flow memory 70 were discussed with reference to FIG. 2 above. If the result is stored in the VESE data flow memory 102, the data may be used in subsequent processing by the scalar engine 94, such as that involving the calculation of lighting effects.

The state controller 96 receives state information 95 and either stores it in the state vector engine (VE) data flow memory 98 or the state scalar engine (SE) data flow memory 100. The state information 95 indicates the particular mode of operation within which the vector and scalar engines 92 and 94 are executing. The state information 95 may be state information that defines specific operational modes compliant with those described in the OpenGL specification.

The scalar engine 94 produces results that are stored in at least one of the scalar engine-vector engine (SEVE) data flow memory 106, a scalar engine intermediate data flow memory 93, and the SE output data flow memory 108. The scalar engine intermediate data flow memory 93 stores results produced by the scalar engine that are used in subsequent operations by the scalar engine. The SEVE data flow memory 106 represents an inter-engine data path that allows the results of the one computation engine (the scalar engine 94) to be provided to another computation engine (the vector engine 92). The data carried along such inter-engine data paths may be referred to as interengine data. The particular destination for the result of the scalar engine 94 is based on the operation code being executed. Note that the arbitration module 14 also generates an ordered operation code for the scalar engine 94. As such, the operation codes provided to the scalar engine 94 by the arbitration module 14 include the corresponding destination address for the result that is generated for each operation code. By having dedicated memories in each of the data flow paths (as shown in FIG. 3), memory contention is eliminated. During each cycle, each memory is only expected to provide one operand to one operation unit in the system. In one embodiment, each memory includes a read port and a write port, where a read operation and a write operation can occur for the memory during a cycle. As previously mentioned, when the computation module 90 is used in a geometric engine for graphics processing, the computation module 90 is performing specific, well-understood functions such that the various state variables, intermediate data storage locations, and the like may be known in advance. By performing such a specific function, memory locations available in the various memories may be dedicated to particular portions of one or more operations, thus eliminating memory contention issues.

A number of optimizations can be included in the vector and scalar engines illustrated in FIG. 3 that allow the well-understood functionality of the computation module 90 to be further exploited to gain added efficiency. Each of these optimizations, which include pre-accumulation registering, per-thread accumulation buffering, shared microcode amongst a plurality of threads, and memory bypass registers may be used alone or in combination with one or more of the other optimizations. In order to further clarify the advantages of each of these optimizations, each optimization is described in detail in a stand-alone environment.

FIG. 8 illustrates a circuit 300 that may be included in the vector engine 92 as illustrated in FIG. 3. In other embodiments, the circuit 300 may be included in other computational blocks that can benefit from reduced latency through efficient pipelining. The circuit 300 includes a multiplier 310 (first operation unit) and an adder 340 (second operation unit). Note that in other embodiments, the operation units may both be multipliers, may both be adders, or may be various combinations of other operation units that receive operands and perform computational functions on those operands to produce a result. The circuit 300 also includes a pre-accumulation register 320, a selection block 330, and memory 350.

The multiplier 310 is operably coupled to receive the multiplication operands 302 (first set of operands). The multiplier 310 combines the multiplication operands 302 to produce a first operation result, which in the case of the multiplier 310 is the product of the multiplication operands 302.

The result produced by the multiplier 310 is stored by the pre-accumulation register 320. The result of the operation performed by the multiplier 310 is also provided to the adder 340, where the result may be used during the next operation cycle by the adder 340. Note that a synchronous system is assumed, where each of the various blocks includes any registers and the associated clock inputs to assure synchronous operation. As such, different blocks within the system can be performing their specific functions independently during a particular cycle, where a cycle may represent a clock period, a half-clock period, multiple-clock periods, etc.

During a first cycle, the multiplier 310 may take a first set of multiplication operands 302 and combine them to produce a first result that is stored in the preaccumulation register 320. During a subsequent cycle, the multiplier 310 may receive a new set to operands that it combines to produce a new result. The pre-accumulation register 320 allows the previous result computed by the multiplier 310 to be held for use in a subsequent operation by the adder 340. As such, a function such as (A×B)+(C×D) could be performed. In such an example, A and B may be the first set of multiplication operands where the result of the multiplication of A and B is temporarily stored in the pre-accumulation register 320. During the subsequent cycle, C and D are multiplied by the multiplier 320, and the result is supplied to the adder 340 along with the previous result (A×B), which is stored in the pre-accumulation register 320. The adder 340 can then add these two operands, (A×B) and (C×D) to produce the desired result. The result may be a final result 342 that is passed on to other circuitry, or an intermediate result that is stored in the memory 350 or the accumulation buffer 360 for further processing by the circuit 300.

Inclusion of the pre-accumulation register 320 is especially valuable in complex operations that include multiple operands. Without the inclusion of the preaccumulation register, the entire latency of the circuit 300 would be effectively doubled for combinations such as the combination of (A×B) with (C×D). This is because without the pre-accumulation register 320, the first multiplication operation must propagate entirely through the circuit 300 and be presented as one of the operands to be adder 340 when the result of (C×D) is the current result of the multiplier 310. Not only does this increase latency, but it also complicates the control required for implementing the simple multiply and add function described.

The memory 350 is included in the circuit 300 to store the results produced by the adder 340. The inclusion of the selection block 330 enables the second operand provided to the adder 340 to be selected from a plurality of potential operands based on operand selection information 332. The memory 350 may include a number of entries and require a number of address and control signals in order to provide the required data for a particular operation. Thus, the particular operation code being executed may include the addressing information (source address) require to access the memory 350.

In order to avoid complex addressing for simple accumulation operations, the circuit 300 may include an accumulation buffer 360 that is coupled to the adder 340 and the selection block 330. The accumulation buffer 360 may be used to accumulate results corresponding to a number of operations. In such instances, the source address for the operation code would indicate that the value stored in the accumulation buffer 360 is one of the operands provided to the adder 340, and the destination address for the result corresponds to the accumulation buffer 360 such that an accumulated result is stored back in the accumulation buffer 360.

The set of potential operands from which the selection block 330 determines the second operand provided to the adder 340 may include the current result of the multiplier 310, a result of a previous multiplication operation as stored in the pre-accumulation register 320, a previous result of an operation performed by the adder 340 (stored in either the accumulation buffer 360 or the memory 350), or any one of a number of additional operands 334. The additional operands 334 may include constants, state variables, or other operands that would be useful in vector operations performed by the vector engine 92.

When the circuit 300 is used in a multi-thread system in conjunction with an arbitration module, such as the arbitration module 14 of FIG. 3, multiple-step operations (those that involve a dependent operation that utilizes the pre-accumulation register 320) must be provided with a level of priority assurance in order to allow the proper value to be present in the pre-accumulation register 320 during the appropriate cycle when that result is to be added with another multiplication result by the adder 340. For example, if a first operation code corresponds to (A×B) and a second operation code is presented corresponding to (C×D), and these results are to be added by the adder 340, it is imperative that the two operations are performed back-to-back (assuming no additional control information is provided to the pre-accumulation register 320). If such priority, or sequential execution is not assured, the result of (A×B) may be forced out of the pre-accumulation register 320 by an intervening operation code executed before the arbitration module 14 allows the (C×D) operation to take place.

In order to ensure sequential execution of operations that require the use of the pre-accumulation register 320, the first operation code in such a sequence should provide an indication to the arbitration module 14 that priority must be reserved for the subsequent dependent operation code within the particular thread that includes these operation codes that utilize the pre-accumulation register 320.

In another embodiment, the pre-accumulation register 320 may include an additional control signal such that it only latches the output of the multiplier 310 when the operation code that is currently being executed indicates that the pre-accumulation register 320 should do so. Note that in a multi-thread environment, the arbitration module 14 may then have to be conscious of the fact that a sequential set of operation codes is pending, and another operation code that stores a result in the pre-accumulation register 320 should not be allowed to execute until the value within the pre-accumulation register 320 has been used.

In order to illustrate the advantages of utilization of the pre-accumulation register 320, an example sequence of operations is presented. In the example sequence, it is assumed that the multiplier 310 requires X cycles to generate the result for a received set of multiplication operands 302. Assuming that the multiplier 310 is properly pipelined, a second result may be generated one cycle after the first result has propagated through the multiplier 310. If the first result has been stored in the pre-accumulation register 320, on a subsequent cycle after the second result has propagated through the multiplier 310, the adder 340 can begin performing the addition of the first and second results. Assuming that the adder takes Y cycles to complete such an addition, the multiply and add operation for two products will require (X+Y+1) cycles of latency. Without a pre-accumulation register, the total latency of the (A×B)+(C×D) is (X+(2Y)+1) cycles as the adder latency is traversed twice.

Assuming that the multiplier 310 and the adder 340 each require one cycle to generate a result, the total latency for a multiply and add operation is three cycles. The first set of operands is received during a first cycle by the multiplier 310. The multiplier 310 combines the first set of operands during the first cycle to produce the first operation result. This first operation result is stored in the pre-accumulation register 320 during a second cycle, which produces a buffered first operation result. During the second cycle, the second set of operands is received by the multiplier 310, and these operands are combined during the second cycle to produce a second operation result. During the third cycle, the buffered first operation result is selected by the selection block 330 as the second operand provided to the adder 340. The buffered first operation result is combined with the second operation result by the adder during the third cycle to produce the desired sum. If the memory 350 or the accumulation buffer 360 captures the result of the adder 340 during a fourth cycle, it may be presented back to the adder 350 during a subsequent cycle for further accumulation with additional products or other operands.

In order to allow more flexibility in a multi-thread environment, a circuit such as the circuit 400 of FIG. 9 may be included within the vector engine or other computational module used by the multi-thread system. The circuit 400 is similar to the circuit 300 of FIG. 8 in that it includes a multiplier 410, an adder 440, a selection block 430, an accumulation buffer 460, and memory 450. The multiplier 410 receives multiplication operands 402 for combination. Note that as stated with respect to FIG. 8 above, the multiplier 410 and the adder 440 may be general-purpose operation units that are capable of performing a number of functions that may include multiplication and addition, or may be specific operation units dedicated to performing other mathematical or functional combination operations on operands to produce a result. The results produced by the adder 440 may be final results 442, or those that are stored in the memory 450 or the accumulation buffer 460 for further processing.

The circuit 400 differs from that illustrated in FIG. 8 in that it includes a plurality of pre-accumulation registers 421–423. The selection block 430 selects a second operand for the adder 440 from a set of potential operands that includes the contents of the plurality of pre-accumulation registers 421–423, data in the accumulation buffer 460 and the memory 450, and additional operands 434.

In one embodiment, an individual pre-accumulation register is included for each of the threads active in the multi-thread system. For example, the first thread preaccumulation register 421 would correspond to a first thread in the system, the second thread pre-accumulation register 422 would correspond to a second thread, and additional pre-accumulation registers would be included such that an Nth thread pre-accumulation register 423 would support the Nth thread in a system that includes N threads (where N is a number). Including multiple pre-accumulation registers increases the cost of the integrated circuit. As such, some arbitration flexibility may be sacrificed to ensure that dependent operations that utilize a single pre-accumulation register occur immediately following the operation upon which the dependent operation depends.

By including a separate pre-accumulation register for each of the threads active in the system, priority for sequential operations that utilize the pre-accumulation register must only be ensured within each of the individual threads. Because each thread typically provides operation codes to the arbitration module in a singular fashion, the maintenance of such priority within the thread is straightforward. The operation code provided by each thread preferably includes thread identify information such that if the operation code corresponds to a code that requires the result of the multiplier 410 to be latched in a pre-accumulation register, control information is generated such that the appropriate thread pre-accumulation register captures the data produced by the multiplier 410. The subsequent operation code that utilizes the stored data causes the operand selection information 432 to select the data in the appropriate pre-accumulation register using the selection block 430.

Note the priority within each of the threads is only limited to priority with respect to other operation codes that utilize the pre-accumulation register for that thread. In other words, a first operation (A×B) may be executed where the result of this operation is stored in the pre-accumulation register corresponding to that particular thread that issued the operation code. That particular thread can then perform numerous other operations that do not utilize the pre-accumulation register prior to performing an operation that utilizes the stored result of (A×B) contained within its respective pre-accumulation register.

As is apparent to one of ordinary skill in the art, a system could be devised that includes M thread pre-accumulation registers, where M is less than N, and N is the number of threads supported in the system. In such an embodiment, multiple threads could share a particular thread pre-accumulation register, and priority within that particular set of threads that share the register is required. In other embodiments, a single thread may include multiple pre-accumulation registers to provide additional flexibility for the ordering of the operations performed by that thread.

FIG. 10 illustrates a circuit 500 that may be included in the vector engine 92 as illustrated in FIG. 3 in order to enhance the computational capabilities of the vector engine with respect to supporting multiple threads of operations. The circuit 500 may also be included in other circuits that would benefit in a similar manner. The calculations performed by the vector engine 92 often include multiply and accumulate functions. Multiply and accumulate functions multiply a first set of operands to produce a product where the product is then added to an accumulated value. A number of sets of multiplication operands may be combined to produce a number of products, and all of the products may be accumulated to produce a final accumulated value that represents the sum of all of the products derived. If each of the threads in the system includes a set of operations corresponding to a number of multiply and accumulate operations, storage of the accumulated values for each of the threads may be performed in a memory structure such as the memory 550 illustrated in FIG. 10. However, the added latency of memory accesses may be undesirable in some operations. More efficient access may be possible utilizing an accumulation register, such as the accumulation buffer 360 illustrated and described with respect to FIG. 8.

In order to support multiple threads, where each thread may include a number of multiply and accumulate operations, the circuit 500 includes a plurality of accumulation registers 560–562. Each of the accumulation registers 560–562 corresponds to one of the threads present in the system. As such, multiply and accumulation operations corresponding to a specific thread can store the resulting accumulated value in a designated accumulation register without concern for the ordering with which those accumulate operations occur with respect to accumulation operations of other threads in the system.

The circuit 500 includes a multiplier 510 and an adder 540 to facilitate the multiply and accumulate operations. The plurality of accumulation registers 560–562 may also be beneficial in other systems where the operations performed on received operands corresponds to functions other than multiply and accumulate operations. Thus, the multiplier 510 may be a different type of operation unit in other embodiments, as may the adder 540. Generally, such operation units receive operands and combine those operands to produce a result that may either be fed to another operation unit or stored in one of the accumulation registers 560–562. The circuit 500, which may be referred to as a multi-thread accumulation circuit, may be included in a vector engine that performs dot product operations, operations involving matrix calculations, or similar operations such that multiply and accumulate functionality of the multi-thread accumulation circuit 500 is desirable.

The multiplier 510 receives multiplication operands 502, where the multiplication operands 502 correspond to a particular operation code issued by selected thread of the plurality of the threads present in the system. The multiplication operands may be determined based on the source addresses included in the operation code as described earlier. The multiplier 510 combines the multiplication operands 502 to produce a product, or first operation result, that corresponds to the selected thread that issued the operation code being executed.

The adder 540 receives the product of the multiplier 510 and also receives a second operand that is selected by the selection block 530. The selection block 530 selects the second operand provided to the adder 540 from a set of potential operands. As is illustrated, the set of potential operands includes the current values, or contents, of each of the plurality of accumulation registers 560–562. The set of potential operands also may include data stored in the memory 550, where the particular data provided from the memory 550 to the selection block 530 may be determined based on control signals issued by the control block 520 based on operation code (op code) information 522. As such, the operation code information 522 may be derived from the operation code being executed such that the control block 520 asserts the appropriate address and control signals to fetch the desired data from the memory 550, where the data fetched is then provided to the selection block 530.

Also included in the set of potential operands are one or more additional operands 534 that may correspond to state variables, constants, or values provided by other blocks within the system, such as a memory that stores results produced by the scalar engine. For example, one additional operand may be configured to a value of zero such that a first multiply and accumulate operation corresponding to a set of multiply and accumulation operations combines the first product calculated with a zero value to determine the first accumulated value. This first accumulated value is then stored in one of the accumulation registers 560–562. Inclusion of a constant value equal to zero as a potential operand that can be provided to the adder 540 may provide an efficient means for clearing an accumulation register prior to execution of a sequence of multiply and accumulate operations.

The adder 540 combines the product of the multiplier 510 with the second operand provided by the selection block 530 to produce a sum. The sum may be stored in any one of the accumulation registers 560–562, where the accumulation register selected is preferably based on the thread to which the operation code being executed corresponds. The sum may also be stored in the memory 550 based on control information generated by the control block 520. The control block 520 receives the op code information 522 which is derived from the operation code that corresponds to the sum produced by the adder 540. The op code information 522 may indicate the particular thread to which the sum corresponds, or may indicate that the sum is to be stored at a particular location within the memory 550 (destination address). Note that additional routes for the resulting sum may be present in a particular circuit, and the op code information 522 may cause the control block 520 to enable such alternate paths. If the control block 520 determines that a particular sum corresponds to a particular thread and should be stored within the accumulation register corresponding with that thread, the control block 520 issues the appropriate control information such that the particular accumulation register captures and stores the sum.

The plurality of accumulation registers 560–562 may include a respective accumulation register for each thread in the system. As such, the first thread accumulation register 560 may correspond to a first thread, the second thread accumulation register 561 may correspond to a second thread, and additional thread accumulation registers may also be included to correspond to all of the remaining threads in the system such that the Nth thread accumulation register 560 correspond to the Nth thread, where N is the total number of threads in the system. In other embodiments, multiple threads may share an accumulation register, however, this would require that accumulation operations within the threads that share the accumulation register be ordered in an appropriate manner such that the accumulated values for each thread remain independent and distinct.

In one embodiment, each of the accumulation registers 560–562 includes a first register section and a second register section. The first register section is used for accumulation operations corresponding to a first set of operation codes for the particular thread for which the accumulation register corresponds. Similarly, the second section is used for accumulation operations corresponding to a second set of operation codes. As such, two accumulated values may be maintained for each thread. Two or more sections per accumulation register may allow a particular thread to execute more than one set of accumulation operations while allowing intermingling of the operation codes corresponding to the different sets of accumulation operations occurring.

In one embodiment, the first register section within each accumulation register accumulates diffuse color information corresponding to graphics primitives, and the second register section accumulates specular color information correspond to the graphics primitives. The diffuse and specular color information may be determined through lighting operation calculations. Due to the fact that the diffuse color calculations are typically independent of specular color computations, the set of operations utilized to calculate these individual color values may be performed independent of each other. However, it may be more efficient to intermingle the operation codes corresponding to each of these types of calculations (in terms of sequential order of execution both within the thread and within the multi-thread system). Providing an accumulation register that allows the values for both to be maintained simultaneously provides more flexibility in the intermingling of the operation codes correspond to these accumulate operations. As such, the thread controller for the thread performing the diffuse and specular color computations can issue commands corresponding to each in a more flexible manner. This can add to the efficiency with which the overall system is able to operate.

In other embodiments, each of the accumulation registers 560–562 may include a plurality of sections, where the number of sections included in each register may be based on the types of operations performed by each of the threads. Thus, in some embodiments some thread accumulation registers may include more sections that others based on the particular operations performed by their corresponding threads.

As described above, the memory 550 can be used to store the results produced by the adder 540 at various addresses based on control information generated by the control block 520. The control block 520 may be a part of the microcode execution circuitry included in the system, where the microcode execution circuitry is described in additional detail with respect to FIGS. 11 and 12 below. Although each of the accumulated values could be stored within the memory 550 rather than in individual accumulation registers, the access time associated with the memory 550 and the overhead associated with determining the appropriate address at which the accumulated value is to be stored may increase the latency and complexity of the vector engine or other computation blocks within which the circuit 500 is included. As such, the plurality of accumulation registers 560–562 may provide added efficiency through reduced latency and complexity.

The functionality of the multi-thread accumulation circuit 500 may be better understood through an example. In the example, a first set of multiplication operands 502 is received, where the operands received correspond to a selected thread of the plurality of threads in the system. The first set of operands is combined by the multiplier 510 to produce a first result. The selection block 530 may be configured by the control block 520 such that the selection block 530 passes a constant zero value as the second operand to the adder 540. The adder 540 then combines the product of the multiplier 510 with the zero value to produce an initial accumulated value. The control block 520 then selects the appropriate accumulation register for storage of the initial accumulated value based on the identity of the selected thread. The initial accumulated value is then stored in the appropriate accumulation register. Assuming, for example, that the selected thread is the first thread, the control block 520 will issue the appropriate control information such that the initial accumulated value is stored within the first thread accumulation register 560.

Before additional accumulation operations corresponding to the first thread are performed by the circuit 500, numerous other accumulation operations corresponding to other threads supported by the system may be performed. Because a plurality of accumulation registers is present in the circuit 500, these accumulated values can be maintained independently of the initial accumulated value corresponding to the first thread. As such, the flexibility with which the arbitration module orders the execution of various operation codes is enhanced.

Subsequent to receipt of the first set of multiplication operands for the initial accumulation operation, a subsequent set of multiplication operands for a subsequent accumulation operation is received. The multiplier 510 combines the subsequent set of operands to produce a second result. The control block receives op code information 522 that indicates that the subsequent accumulation operation corresponds to the first thread. As such, the control block 520 issues control information to the selection block 530 such that the current value stored in the first thread accumulation register 560 is selected as the second operand provided to the adder 540. The adder 540 combines the second result determined by the multiplier 510 with the initial accumulated value stored in the first thread accumulation register 560 to produce a second accumulated value. The control block then issues additional control information to the first thread accumulation register 560 such that the first thread accumulation register 560 captures and stores the second accumulation value to produce a second accumulated result. Note that additional data paths not shown in FIG. 10 are present to allow the contents of the various accumulation registers 560–562 to be accessed by other circuit blocks for use in the system. Subsequent accumulation operations for the first thread may then occur such that the final value present in the first thread accumulation register 560 at the conclusion of all of these subsequent accumulation operations represents the end result of the set of accumulation operations corresponding to the first thread.

In graphics processing operations, a number of processing operations may be repeated for each of the vertices of a graphics primitive. For example, similar lighting operations may be performed for each vertex, where the calculations required for such lighting effects at each vertex are very similar. Thus, although each thread controller present in the system may perform independent calculations corresponding to a particular vertex or lighting operation, the operation codes utilized to perform such calculations may be standardized among a group of thread controllers.

FIG. 11 illustrates a multi-thread processing circuit 600 that includes a plurality of thread controllers 601–603, where each of the thread controllers 601–603 manages processing operations for a particular operation. In one example embodiment, each of the thread controllers 601–603 may correspond to a separate sub-light calculation thread (lighting calculations are described in additional detail below). Because each of the thread controllers 601–603 may be quite similar in function and merely be provided with different sets of data to perform their respective calculations, the controllers may be substantially similar in implementation. In one embodiment, each of the thread controllers 601–603 may be implemented as a state machine, where the overall functionality of all of the state machines is substantially similar with respect to the operations that the thread controllers cause to occur for their respective threads. As such, each of the thread controllers 601–603 may be relatively simple in design and easily replicated such that the same design can be utilized for all of the thread controllers 601–603. Additional thread controllers associated with graphics processing functions such as primitive clipping, primitive transform operations, and barycentric coordinate computation may also be included in the system, where one or more of each type of thread may be present.

Each of the thread controllers 601–603 provides information to the arbitration module 610 such that specific operation codes are eventually executed by the multithread processing circuit 600. Each of operation codes, as described above, includes an thread identifier, a type of operation, operands (which may be determined based on a first and a second source address), and a destination address to which the result of the operation is stored. Rather than passing all of the parameters from the thread controller to the arbitration module 610 and then on to the remaining portion of the multi-thread processing circuit 600, signaling bandwidth between the thread controllers and the other circuit elements can be reduced by encoding the operation codes using sets of operation code identifiers. These encodings can be used to reference a predetermined set of operation codes that are shared by the plurality of threads. Thus, rather than sending all of the data required for the operation code, an encoding or indexing scheme can be used to select the operation code desired from a predetermined set of operation codes, and the various parameters associated with the operation code can be derived based on the limited amount of information provided in the set of operation code identifiers provided.

In the multi-thread processing circuit 600 of FIG. 11 that supports a plurality of threads, each thread controller of the plurality of thread controllers 601–603 generates a sequence of sets of operation code identifiers. Each set of operation code identifiers includes a thread identity that indicates which thread controller generated the set of operation code identifiers. Also included in the set of operation code identifiers is an instruction identity, where the instruction identify is utilized in conjunction with the thread identity to determine the particular operation code to be executed. The set of operation code identifiers passed from the thread controllers 601–603 to the arbitration module 610 may also include additional parameters such as a vertex identity, where the vertex identity indicates to which vertex of a graphics primitive the operation to be performed corresponds. In another embodiment, a parameter is included in the set of operation code identifiers that corresponds to a light source identity that indicates a particular light source for which the calculation is to be performed. Such a light source identity parameter is useful in graphics systems that allow for a plurality of different light sources to effect the coloration of the various pixels included in a graphics primitive. The calculations required for determining such lighting operations may be based on a lighting formula described in additional detail below. In another embodiment, a parameter is included in the set of operation code identifiers that corresponds to a texture coordinate set index. This texture coordinate set index parameter may be used to determine a texture coordinate set that is to be processed, where the processing can include transforming, generating, or clipping the texture coordinate set.

The arbitration module 610 determines an order of execution of command codes corresponding to the sets of operation code identifiers that it receives from the plurality of thread controllers 601–603. The arbitration module preferably performs this determination based on some type of prioritization scheme that is described in additional detail with respect to FIG. 6 below. Once the arbitration module 610 has selected a particular set of operation code identifiers to be executed during the next cycle, the arbitration module 610 passes that selected set of operation code (op code) identifiers 612 to the microcode generation block 620.

The microcode generation block 620 generates a corresponding set of input parameters from the set of operation code identifiers 612. These input parameters are then passed to the computation engine 640 to allow the operation code selected by the set of operation code identifiers 612 to be executed. The input parameters passed to the computation engine 640 are determined based on the particular operation code that has been encoded using the set of operation code identifiers 612. This may be accomplished by storing the predetermined set of operation codes shared by the plurality of threads in a lookup table 660 or a similar storage device. In order to reduce die area in integrated circuit embodiments, the information needed for the shared microcode (that which may be stored in the lookup table 660 in some embodiments) may be reduced a set of logic gates. By indexing through the lookup table 660 based on at least portions of the set of operation code identifiers 612, the operation code to be executed can be determined. As stated earlier, the operation code includes the type of operation to be performed, the operands (or addresses for the operands) to be used in the operation, and a destination address to which the result 642 is to be stored in the memory 650. In some embodiments, information retrieved by referencing the lookup table may be combined with additional portions of the set of operation code identifiers to produce the set of information needed to complete the operation code to be executed.

The memory 650 included in FIG. 11 represents both the storage memory for the input data provided to the computation engine 640 as well as storage for the results 642 produced by the computation engine 640. In some embodiments, the memory 650 may equate to the various memory structures shown in FIG. 3 where the computation engine 640 is included in either the vector engine 92 or the scalar engine 94. Thus, in one embodiment, the memory 650 may include the intermediate data flow memory 66, the input data flow memory 64, and the other memory structures that can provide data to the vector engine 92, or can store the results produced by the vector engine 92.

The computation engine 640 is operable to receive input parameters provided by the microcode generation block 640 either directly or indirectly through the use of the memory 650. The input parameters to the computation engine 640 include at least one source operand, at least one operation indication (which may be a mathematical operation), and a destination location. The input parameters may also include control signals that control an arithmetic pipeline within the computation engine 640. The computation engine performs the selected operation using the at least one source operand to produce a result, where the result is stored at the destination location included in the input parameters. In some embodiments, the operation indications indicate mathematical operations such as dot product functions, multiply and accumulation functions, and other operations commonly used in graphics processing.

FIG. 12 illustrates an example lookup table 660 that includes a predetermined set of operation codes that may be shared by a plurality of threads. Each operation code included in the lookup table 660 is encoded based on at least an instruction index. The instruction indices are illustrated on the left side of lookup table 660 (I-0 through I-N). The example illustrated in FIG. 12, the operation codes stored within the lookup table 660 correspond to a number of mathematical operations to be performed by the computation engine 640 in order to determine the appropriate results desired by each of the thread controllers 601–603. Note that this assumes that the thread controller 601–603 implement substantially similar functions. In other embodiments, certain operation codes at various instruction indexes may be selectively omitted or included by different thread controllers such that differentiation amongst the functionality of the thread controllers is achieved while still providing a level of operation code sharing. In other embodiments, the lookup table 660 may store a plurality of predetermined sets of operation codes, where different predetermined sets of operation codes correspond to different thread controllers within the system. For example, in one embodiment, there may be a predetermined set of operation codes corresponding to sub-light threads, a predetermined set of operation codes corresponding to a parent lighting thread, a predetermined set of operation codes corresponding to a clipping thread, a predetermined set of operation codes corresponding to a transform thread, and a predetermined set of operation codes corresponding to a barycentric coordinate conversion thread.

When the microcode generation block 620 receives a set of operation code identifiers corresponding to an operation code included in the predetermined set of operation codes, it uses parameters included in the set of operation code identifiers to determine which operation code or codes should be executed in response to the set of operation code identifiers received. As stated above, the set of operation code identifiers includes at least a thread identity and an instruction identify. In order to determine the input parameters to be provided to the computation engine based on the set of operation code identifiers, the microcode generation block 620 may reference the lookup table 660 based on the instruction identity to retrieve a particular operation code stored at a location corresponding to that instruction identity. For example, if the instruction identity encodes the instruction I-O, this corresponds to an operation code that multiplies the operands A and B and adds the resulting product to a value stored within an accumulation register. As is illustrated in FIG. 12, the data represented by the values A and B may represent input data retrieved from specific memory locations.

As is illustrated to the right of the lookup table 660, the operand A represents an input retrieved from a memory identified as "memory1". Within memory1, the particular address for the data to be used as an operand is determined based on a block number (Block) and an index (Index) within the memory. Note that this is an example to illustrate how data to be acted upon may be located within various memory structures, and, as is apparent to one of ordinary skill in the art, more or less information may be included in each of the operation codes as stored in the lookup table 660 to facilitate such operand determination. Thus, in other embodiments, separate memory structures may be included for separate threads where indexing through those separate memory structures is simplified. In other embodiments, data may be shared between various threads in a manner that does not require block separation of data for the different threads. In the particular embodiment illustrated, the block is determined based on a thread identify (ID) parameter included in the set of operation code identifiers, whereas the particular index to be used is determined based on a light identity parameter included in the set of operation code identifiers. Thus, in this example, the block may determine a base address whereas the index indexes through that block to locate the appropriate data to be used as the first operand A.

Similar to operand A, the operand B is an input derived from a memory structure labeled "memory2". The address for the operand B is determined by addressing memory2 based on a block (Block) determined from the thread identity parameter and a constant value "Constant1". Thus, the storage of the operand B within the block for each of the threads may be at a constant offset from a block boundary. As is apparent to one of ordinary skill in the art, various organizational schemes can be used to store the appropriate data to be acted upon within memory structures accessible to the computation engine 640 to facilitate the performance of the operations required by each of the thread controllers 601–603.

In the example shown in FIG. 12, it is assumed that separate accumulation registers are present for different threads included in the system. As such, the accumulator used to fetch a current value that is combined with the product of A and B is determined based on the thread identity parameter included in the operation code identifiers received.

The other operation codes shown to be included in the lookup table 660 include various mathematical operations that include the identities of operands and memory locations (M1–M5) associated with the various operation codes to be executed by each of the threads in the system. As was the case with the operands A and B, memory locations M1–M5 may be variables which are determined based on one or more of the parameters included in the set of operation code identifiers received from the arbitration module 610. Thus, M1 may represent a specific memory location for one thread, whereas it represents a different memory location for another thread.

Although the functions illustrated in FIG. 12 that are included in the lookup table 660 have been generalized to equate to mathematical operations and data fetching and storing, a lookup table 660 may, in fact, store actual microcode, which includes the various bits of control information required to configure the computation engine 640 in the appropriate manner to perform the desired fmctions encoded by the operation code. Computation engine 640 may include an arithmetic pipeline such as the simplified multiply and accumulate circuit shown in FIG. 10. A portion of the information stored at the various entries within the lookup table 660 may correspond to the operation code information 522 desired by the control block 520 and the circuit 500 of FIG. 10 that allows the control block 520 to provide the appropriate control signals to the various circuit components included in the circuit 500. In other examples, the need for a control block can be eliminated by including the actual values for the various signals routed to the circuit blocks included in the arithmetic pipeline being controlled.

In some embodiments, each of the thread controllers 601–603 may be implemented as a state machine or sequence controller that generates a sequence of sets of operation code identifiers corresponding to the operation codes to be executed within the computation engine 640. Because the actual operation codes to be executed can be determined through the use of microcode generation block 620, the amount of information that must be provided by each of the thread controllers 601–603 to the arbitration module 610 which is then passed on to the microcode generation block 620 is reduced. This reduces circuit complexity as well as the overhead associated with storing the sequential set of operation codes within each of the thread controllers 601–603. For example, if each of the thread controllers 601–603 corresponds to a sub-light thread, all of the data corresponding to each of the operation codes that those threads must execute need not be stored within each instantiation of the substantially similar thread controllers. Instead, much less information can be stored within each thread controller and a shared copy of the complete set of operation codes can be stored in a lookup table or similarly accessible location. This simplifies both the data paths between the various circuit blocks as well as the individual instantiations of the thread controllers. As such, system cost can be reduced while increasing overall efficiency.

By moving the microcode "behind" the arbiter with respect to the viewpoint of the thread controllers, the thread controllers are greatly simplified. As such, these simple thread controllers are easily replicated, and more thread controllers can be included in the system. More thread controllers translates to more threads executing in parallel, where such parallel execution improves the utilization of the operation units (such as arithmetic units) such that system performance is improved.

Additional optimization may be obtained by encoding a number of operation codes using a single set of operation code identifiers (i.e. one set of operation code identifiers causes a number of sequential operation codes to be executed). However, this may reduce the flexibility with which the arbitration module 610 can utilize the computational resources available to the system. As is apparent to one of ordinary skill in the art, various tradeoffs with respect to simplification of the encoding and flexibility with which the arbitration module can execute various operation codes exist, and such tradeoffs may be taken in account in the design of the particular system desired.

A number of the calculations required to perform the graphics processing operations described herein involved dependent operations where a subsequent operation or calculation utilizes a value derived in an earlier calculation or operation. In many cases, resultant data produced by the computation unit, such as the vector engine 92 illustrated in FIG. 3, is stored in memory structures such as the intermediate data flow memory 66. In one example, the vector engine 92 performs a first calculation on a first set of operands to produce a first result that is stored in the intermediate data flow memory 66. The results stored in the intermediate data flow memory 66 may be required as an input operand for a subsequent operation. If so, this subsequent operation may have to wait for the result produced from the initial operation to be stored in and retrieved from the intermediate data flow memory 66. The intermediate data flow memory 66 has an associated latency.

Because multiple threads may be operating within the system described herein, and it is desirable to provide the arbitration module with maximum flexibility with respect to interleaving of the different operation codes provided by each of the threads, latency associated with dependent calculations is undesirable. Such latency associated with dependent calculations, where the dependent calculation can not be initiated until the data upon which it depends is available, places limitations on how certain operations codes may be intermingled by the arbitration module 14. This may reduce the efficiency with which the resources in the computational pipeline are utilized. Therefore, it is desirable to implement additional circuitry that allows latency associated with the memory structures included in the computation circuit to be avoided or minimized.

FIG. 13 illustrates a computation engine 700 that includes a first operation unit 710, memory 750, a first memory bypass register 760, and a selection block 730. The first operation unit 710 may be an operation unit such as the vector engine 92 illustrated in FIG. 3 that performs processing functions such as dot product computation, addition, multiplication, or multiply and accumulate operations. The memory 750 is operably coupled to the first operation unit 710 and is used to store results generated by the first operation unit 710. Thus, the memory 750 may be similar to the intermediate data flow memory 66 of FIG. 3 as it may temporarily store resultant data produced by the vector engine 92 for subsequent reuse by the vector engine 92. The results produced by the first operation unit 710 may also be provided to other memories such as output data flow memories.

The first operation unit 710 receives a first operand 712 and a second operand 712. The first operand 712 may be provided by an input data flow memory such as the input data flow memory 64 illustrated in FIG. 3. The selection block 730 is used to provide the second operand 714. The selection block 730 selects the second operand 714 from a set of potential operand. Included in the set of potential operand are additional operands 734, which may be received from other memory circuits such as the input data flow memory, output memories from other computation units such as a scalar engine, etc. One of the potential operands included in the set of potential operands is memory source data 756 provided by the memory 750. The memory 750 provides the memory source data 756 in response to source address information 752. The source address information 752 may originate from a control block that determines which data currently stored in the memory 750 are to be used for a subsequent operation within the first operation unit 710.

When the memory 750 receives a result from the operation unit 710 for storage, the memory 750 stores the result produced by the first operation unit 710 based on a destination address 754. The destination address 754 is preferably generated by control block that generates such control signals in response to command codes received and executed. As stated above, the memory 750 has associated memory latency.

In some instances, the first operation unit 710 will receive a first set of operands corresponding to a first operation where the results for the first operation are then stored in the memory 750. If a subsequent operation is to be initiated by the first operation unit 710 that utilizes the result of the first operation within a short period of time, the operation may have to be stalled in order to satisfy the latency requirements of the memory 750. Stalling the first operation unit 710 is undesirable as it reduces the overall speed with which the system operates. If a multi-thread system is utilizing the first operation unit 710, other operations may be executed prior to the dependent operation such that the latency of the memory 750 can be satisfied. However, this limits the flexibility of the arbitration module to intermingle commands codes to be executed and may compromise overall system efficiency.

In order to reduce or avoid the latency associated with the memory 750, the computation engine 700 includes the first memory bypass register 760. The first memory bypass register 760 is coupled to the first operation unit 710, where the first memory bypass register stores the result generated by the first operation unit 710 to produce a first stored result. The first stored result is a time-delayed version of the result produced by the first operation unit. The result produced by the first operation unit 710 is stored by the first memory bypass register 760 during a clock cycle subsequent to the clock cycle within which the result was generated by the first operation unit 710. Storage of the result in the first memory bypass register 760 may generally coincide with the initiation of storage of the result in the memory 750.

In one embodiment, the first memory bypass register 750 operates in a manner such that the result produced by the first operation unit 710 is available on the output of the first memory bypass register 760 one clock cycle after the result is made available on the output of the first operation unit 710. As such, the result is available on the output of the first memory bypass register 760 one clock cycle delayed. By presenting this delayed version of the result to the selection block 730 as a potential operand for the subsequent operation, dependent operations may be performed more quickly than if they were required to wait for the latency period associated of the memory 750.

In some instances, the result produced by the first operation unit 710 may be desired for a dependent operation two or more clock cycles after the result is produced by the first operation unit 710, but still prior to a number of clock cycles required to satisfy the latency requirements of the memory 750. Thus, if the memory 750 is relatively slow, multiple memory bypass registers may be included in a serial chain such that each additional memory bypass register produces a different time-delayed version of the results produced by the first operation unit 710.

In one embodiment, a second memory bypass register 770 is coupled to the output of the first memory bypass register 760. The second memory bypass register stores the stored result from the first memory bypass register 760 to produce a second stored result, where the second stored result is a time-delayed version of the first stored result stored in the first memory bypass register 760. Thus, the second memory bypass register 770 may provide a time-delayed version of results produced by the first operation unit 710, where the time-delay is twice that provided by the first memory bypass register 760. As is illustrated, subsequent memory bypass registers included in the serial chain, such as the Nth memory bypass register 780, may be included to provide additional time-delayed versions of the results produced by the first operation unit 710, where the time-delayed versions all provide a different predetermined delay in terms of a number of clock periods of delay.

If a number of additional memory bypass registers are included in serial chain, a first additional memory bypass register at the head of such a serial chain is coupled to the first memory bypass register 760 (in the same manner as the second memory bypass register 770 in FIG. 13). The results produced by the first operation unit 710 are first stored in the first memory bypass register 760 and then passed sequentially along the serial chain such that multiple time-delayed versions of each result produced by the first operation unit 710 are made available. The number of registers included in such a serial chain (N) may be determined based on the latency of the memory 750.

The output of the first operation unit 710 may also be included in the set of potential operands from which the selection block 730 selects the second operand 714. By allowing the output of the first operation unit 710 to be passed immediately back to the input of the first operation unit 710 as the second operand 714, the memory latency can be completely avoided. This is valuable as the controller issuing instructions to the computation engine 700 can assume that there is no latency associated with the memory 750.

In order to determine if the data on the output of the first operation unit 710 or the data stored in one of the memory bypass registers 760–780 is to be selected by the selection block as the second operand 714, the source address for the second operand 714 may be compared with the destination addresses for the data at these locations. The destination address for each result determines where that data is to be stored in the memory 750. If the source address for a subsequent operation matches the destination address for a result, that result should be selected. In order to allow such comparison to take place for the results stored in the memory bypass registers 760–780, each result stored in these registers should be accompanied by the destination address at which that result is being stored in memory. Thus, even though the memory latency has not yet been satisfied, a memory read operation can be mimicked by providing data stored in one of the memory bypass registers in response to a source address received.

In some embodiments, the width of the data path in the circuit may be such that multiple data words are present in the data path at once. For example, if each of the first and second operands 712 and 714 are 128 bits wide and the result of the first operation unit is also 128 bits wide, there may only be relevant data within certain portions of the result. For example, the first operation unit 710 may include multiple sub-operation units that each process a portion of the data in the data path. In such an example, a first sub-operation unit may process a first 32-bit portion of each of the operands to produce a first 32-bit portion of the result, a second operation unit may process a second 32-bit portion of each of the operands to produce a second 32-bit portion of the result, and so on. As such, in some cases only some of these operations may produce valid data that is to be stored in the memory 750. In order to allow the other portions of data corresponding to the destination address for the result to be preserved, validity bits may be included with the result. Each of the validity bits indicates if a particular portion of the result represents valid data. When the data is stored in the memory 750, only the valid portions are written at the destination address and the remaining portions of the data currently stored at the destination address are preserved.

In a system in which validity bits are included to allow for segmentation of the data path, the computation engine 700 may include additional circuitry such that the valid bits for results stored in the memory bypass registers (and at the output of the first operation unit 710) are taken into account when selecting the second operand 714. If a match is determined between the source address for the second operand and a destination address stored in one of the memory bypass registers, the validity bits that accompany the destination address are examined to determine if the result stored in the memory bypass register represents a complete result, or if only portions of the result are valid. If only portions are valid, the remaining portions are fetched from the memory 750 using the source address. The portions can then be combined by the selection block to generate the second operand 714, where the combination represents what will be stored in the memory 750 at the source address once the memory latency has been satisfied.

In another embodiment illustrated in FIG. 14, the memory bypass register 761 may be coupled between the first operation unit 710 and the memory 750 where such a memory bypass register may also aid in pipelining the computation engine 701. The output of the memory bypass register 761 is provided to the input of the selection block 730, and as such the entire latency of the memory 750 can be avoided by selecting the output of the memory bypass register 761 as the second operand 714. The remaining portions of the computation engine 701 are similar to those of the computation engine 700 illustrated in FIG. 13.

FIG. 15 illustrates a block diagram of a computation circuit 800 that includes multiple operation units. The computation circuit 800 includes a first operation unit 810 and a second operation unit 850. The first operation unit 810 receives a first operand 812 and a second operand 814 and combines the first and second operands 812 and 814 to produce a first result. As was the case with the circuits described in FIGS. 13 and 14 above, the first result produced by the first operation unit 810 may be stored in the first memory 830 based on a destination address. The first memory has a first memory latency. In order to avoid the latency associated with the first memory 830 such that dependent calculations may be performed without having to wait, one or more memory bypass registers may be provided with respect to the first memory 830.

The first memory bypass register 820 provides a bypass route around the first memory 830. In other embodiments, the first memory bypass register 820 may be coupled between the first operation unit 810 and the first memory 830 in a similar manner as to the first memory bypass register 761 illustrated in FIG. 14. In other embodiments, multiple memory bypass registers may be chained to provide various delayed versions of the results produced by the first operation unit 810 in a similar manner as described with respect to FIG. 13 above.

The first memory bypass register 820 has a corresponding first bypass latency that is less than the latency of the first memory 830. In one embodiment, the first bypass latency associated with the first memory bypass register 810 is a single clock cycle. In other embodiments, the first memory bypass register 820 may be clocked in a manner such that the latency associated with the first memory bypass register 820 is two or more clock cycles.

In yet other embodiments, the first memory bypass register 820 may be selectively enabled or disabled such that the control signals generated based on a particular command code will capture data within the first memory bypass register 820 for use in a subsequent dependent operation when it is recognized that the latency associated with the first memory 830 is greater than the time available between the two operations to be executed. As such, a first independent operation may be executed where the result is selectively latched or stored within the first memory bypass register 820, and subsequent operations are performed that do not result in the first memory bypass register 820 storing their respective results. When a subsequent dependent operation arrives, the contents of the first memory bypass register 820 can be selected as the second operand 814 such that the dependent operation can occur. As such, the dependent operation may occur without concern for the latency associated with the first memory 830. Note that such selective use of the first memory bypass register 820 may involve some prioritization of command codes executed.

The second operation unit 850 receives a third operand 852 and a fourth operand 854 and combines the third and fourth operands 852 and 854 to produce a second result. The second result may be stored in a second memory 870 in a similar manner as the first result is stored in the first memory 830. The second memory 870 has an associated second memory latency. In order to avoid at least a portion of this latency, the second memory bypass register 860 may be included in the computation circuit 800.

The second memory bypass register 860 is coupled to the second operation unit 850 and stores the results produced by the second operation unit 850 (to produce a second stored result). The second memory bypass register 860 may have an associated second memory bypass latency, however, this latency is less than the latency associated with the second memory 870. As such, the output of the second memory bypass register 860 can provide a time-delayed version, or latched version, of the output of the second operation unit 850 in a more timely manner than the second memory 870.

The selection block 840 provides the second operand 814 to the first operation unit 810. The selection block 840 selects the second operand 814 from a set of potential operands based on selection information received. The selection information may be derived from the particular operation code executed, where the operation code may be determined from numerous operation codes that are pending for multiple threads. The set of potential operands from which the selection block selects the second operands 814 includes the first stored result in the first memory bypass register 820, the second stored result as stored in the second memory bypass register 760, and data stored in at least one of the first and second memories 830 and 870.

In other embodiments, the latencies associated with the first and second memories 830 and 870 may be such that multiple memory bypass registers are included in serial chains corresponding to each of the first and second memories 830 and 870. Thus, multiple memory bypass registers may be included for each memory such that multiple time-delayed versions of the results produced by each of the operation units 810 and 850 are available. Such multiple time-delayed versions each provide a different level of latency, where, as described with respect to FIG. 13 above, the number of bypass registers included for each memory may be associated with the latency for that particular memory.

In yet other embodiments, the latency associated with the first and second memories 830 and 870 can be completely avoided. This is accomplished by providing the results generated by the first and second operation units 810 and 850 as inputs to the selection blocks 840 and 880 such that outputs generated by the operation units can be used in a subsequent operation immediately after generation.

The selection block 840 selects the first stored result stored in the first memory bypass register 820 for use in a subsequent operation performed by the first operation unit 810 when the latency associated with the first memory 830 exceeds a time period associated with the spacing between the first operation and a second operation that is dependent on the results of the first operation. In the case where multiple memory bypass registers are provided corresponding to the first memory 830, the selection block 840 selects a corresponding one of the delayed results stored within these memory bypass registers when the latency associated with the selected register matches the time period between the first operation and the dependent second operation which utilizes the results of the first operation.

The selection block 880 performs a similar function as the selection block 840, where the selection block 880 selects the fourth operand 854 from a second set of potential operands. The second set of potential operands includes similar potential operands as the first set of potential operands. As is apparent to one of ordinary skill in the art, each of the selection blocks 840 and 880 may receive other potential operands that may or may not also be received by the other selection block.

The selection block 840 and 880 may select the second operand 814 and the fourth operand 854, respectively, based on comparisons between the source addresses associated with these operands and the destination addresses for the various potential operands that each selection block receives. For example, if the destination address for the result in the first memory bypass register 820 matches the source address for the fourth operand 854, the selection block 880 will select the result stored in the first memory bypass register 820. This was described above with respect to FIG. 14. The data path segmentation through the use of validity bits described with respect to FIG. 14 above may also be applied to the circuit shown in FIG. 16.

The inclusion of memory bypass registers, which may also be referred to as snoop registers, allows the latency associated with memory structures that store results that may be used in dependent calculations to be avoided. This may allow for faster overall throughput in computation engines that support dependent calculations, and may also enable more flexible intermingling of different operations to be performed by an arbitration block in a multi-thread environment.

FIG. 4 illustrates a graphical representation of a computation engine 110 that may be used in a geometric engine. The computation module 110 includes the computation engine 12, the arbitration module 14, the input controller 62, the input data flow memory 64, the output data flow memory 70, the output controller 68 and a plurality of thread controllers 115, 117, 119, 121, 127, 129, 131, and 133. Each of the thread controllers corresponds to a particular thread of an application, where the application may correspond to the processing of graphics primitives in accordance with the OpenGL specification.

The vertex distribution block 112 receives input vertex data 134, or at least portions thereof, and distributes this data on a vertex-by-vertex basis to the transform threads 114, 116, and 118. The distribution performed by the vertex distribution block 112 may be performed such that when a transform thread has completed processing a vertex, the vertex distribution block provides it with the next pending vertex to be processed. The input vertex data 134, or at least portions thereof, is also received by the input controller 62 such that data relating to the input vertex data to be processed by the various threads in the system will be available in the memory structures included in the circuit. The input vertex data stored in the memory structures may include spatial coordinates, color components, texture coordinates, and lighting effect parameters.

Thread controllers 115, 117 and 119 correspond to transform threads 114, 116 and 118. Each of the transform threads 114, 116, and 118 perform transform functions on the vertex data that they receive. The transform threads may process the vertex information that they receive without regard for the primitive to which the vertex belongs. As such, each of the transform threads may operate independently of the other transform threads. Although the example illustrated in FIG. 4 includes three transform threads, a greater or lesser number of transform threads may be included in other embodiments. The transform function performed by the transform threads 114, 116, and 118 may transform the coordinates for the vertex from object or model coordinates to clip coordinates such that clipping operations can be performed on the primitive of which the vertex is a part. The transform threads may also be used to generate eye coordinates from the object or model coordinates, where the eye coordinates may be used by one or more attribute threads. These transform operations typically include vector operations that utilize the vector engine described above.

For each vertex, a transform thread determines whether the vertex lies outside of one of a plurality of clipping planes. The plurality of clipping planes may include the six planes of a clip volume and six user-defined clipping planes. The transform thread generates a clipping distance corresponding to the vertex for each of the clipping planes. The sign bit for each clip distance may be used as the clip code for the corresponding clipping plane with respect to the vertex. The resulting clipping distances for each vertex with respect to each plane may be stored in the intermediate data flow memory 66 at a designated location. In other embodiments, the transform threads may perform more elaborate transformation operations such as skinning or morphing operations. Note that the thread controllers 115, 117 and 119 may be combined into a single thread controller that manages the three transform threads, 114, 116 and 118.

The thread controller 121 corresponds to the clip thread 120 such that the thread controller 121 issues a sequence of command codes to the arbitration module 14 that perform clipping functions for individual primitives. The clip thread 120 receives input primitive data 122 that indicates which vertices are included in each primitive. Thus, the clip thread 120 can group transformed vertices into sets, where each set of vertices corresponds to a primitive. Primitives can include points (one vertex), lines (two vertices), triangles (three vertices), etc.

The clip thread 120 uses the clip codes and clipping distances produced by the transform threads 114, 116 and 118 to produce barycentric coordinates for each new vertex (clipped vertex) of the primitive created by the clipping of the primitive by a clipping plane (the original vertex has been determined to lie outside of the clipping plane and a new vertex within the clipping plane has been generated). For a detailed discussion of the clipping process performed by the clip thread 120, refer to a co-pending patent application entitled "Method and Apparatus for Clipping an Object-Element in Accordance with a Clipped Volume", which has a Ser. No. of 09/496,732 and a filing date of Feb. 2, 2000. The results produced by the clip thread 120 may be stored in an intermediate data flow memory, such as the intermediate data flow memory 66 described with respect to FIG. 3 above, such that these results may be used by the subsequent threads for additional processing.

While the barycentric coordinates are being generated by the clip thread 120, operations corresponding to lighting effects, texturing, and the like may also be in progress. Thread controllers 127, 129 and 131 control sets of attribute threads 126, 128, and 130 included as part of the multi-thread application. The attribute processes (APs), or attribute threads, 126, 128, and 130 may include threads corresponding to linearly interpolated attributes, such as colors and textures. Threads included in the attribute threads 126, 128, and 130 may correspond to parent lighting effect generation, texturing operations, fog effects, and sub-lighting effect generation. In a particular embodiment, lighting effects generation may include a parent light and up to eight sub-lights. In addition, there may be multiple texturing operations corresponding to multiple texture maps. The thread controllers 127, 129, and 131 provide the arbitration module 14 with operation codes corresponding to the sets of attribute threads 126, 128, and 130. The arbitration module 14 provides the operation codes to the computation engine for execution, and, as described above, the arbitration module 14 may intermingle operation codes corresponding to the attribute threads and those corresponding to transform and clipping operations. It should be noted that the processing of the lighting effects and texturing threads for vertices of a primitive may be performed in parallel with the performance of the clipping thread for the vertices of the primitive.

The attribute threads may be dependent on the clip thread determining that at least a portion of the primitive being processed lies within the clip volume. If the clip thread determines that the entire primitive lies outside of the clip volume, there is no point in generating attributes for the vertices as rendering the primitive will not result in the generation of any pixel data.

The barycentric thread 132, which is controlled by thread controller 133, includes the operation codes for interpolating the attributes produced by the attribute controllers. Such interpolation uses barycentric ratios or weights for various vertices to determine the appropriate values for various attributes associated with those vertices. The barycentric ratios determine where any clipped vertices (newly generated by the clip thread) lie in relation to the original vertices of the primitive being processed. As such, the values for the attributes at the original vertices calculated by the attribute threads can be used to determine the values of the attributes at the clipped vertices (adjusted attributes) using these barycentric ratios. The clip thread 120 indicates to the barycentric thread the location of original vertices for each primitive as well as the newly generated clipped locations for these vertices in barycentric coordinates. The thread controller 133 communicates with the arbitration module 14 such that the operation codes of the barycentric thread 132 are executed.

The output controller 68 receives a final vertex list for each primitive from the clip thread 120 and assembles the various attributes, coordinates, etc. for the primitive such that the assembled primitive may be passed on for rasterization as output vertex data 136. If clipping has occurred for the primitive, the final vertex list will include new vertices generated by the clip thread. If no clipping has occurred, the vertex list will include the original vertices for the primitive. Assembling primitives for rasterization may include fetching the various attributes for the primitive from the output data flow memory 70.

In a prioritization scheme, the operation codes of the barycentric thread 132 may be given priority over other operation codes from the other threads. This helps to force vertices out of the pipeline of the computation engine 110 such that new vertices may be fed into the pipeline for processing. With such a prioritization scheme, vertices are effectively "pulled" through the pipeline from the back end (output end). As a vertex is pulled out (final processing for a vertex is completed), room is made in the pipeline for a new vertex. As such, a high level of throughput with minimal latency is achieved within the pipeline of the computation engine 110.

FIG. 5 illustrates a flow diagram of a method for arbitrating access to a computation engine within a geometric engine of a video graphics system. The process begins at step 140 where a determination is made as to whether at least one operation code is pending. The operation codes are received from a plurality of thread controllers, where each thread controller manages a corresponding thread of a given application. Since each of the thread controllers operates independently of the others, multiple operation codes may be received at any given operational cycle of the operational engine. Preferably, each thread controller only provides one operation code for processing at a give time. If, for a given clock cycle of the computation engine, no operation codes are pending, the method proceeds to step 142 where the given clock cycle is skipped. When the given clock cycle is skipped, the computation engine does not initiate processing of a new operation. After skipping the clock cycle, the method proceeds to step 144 and moves to the next clock cycle.

If it is determined at step 140 that at least one operation code is pending, the method proceeds to step 146. At step 146, a determination is made as to whether only one operation code is pending. If only one operation code is pending, the method proceeds to step 148 where the pending operation code is provided to the computation engine for execution. Having done this, the method proceeds to step 150 where a determination is made as to whether another operation code has been received during the processing of the current operation code. If not, the method proceeds to step 144. If another operation code has been received, the method proceeds to step 152 where the new operation code(s) is added to a pending operation code list. After step 152, the method proceeds to step 144.

If it is determined at step 146 that more than one operation code is pending, the process proceeds to step 154. At step 154, a priority operation code is determined based on an application specific prioritization scheme. In one embodiment, the application specific prioritization scheme prioritizes operation codes based on two primary objectives (two levels). At the first level, prioritization amongst the various threads is back to front. In other words, those threads that perform the final processing steps for vertices (e.g. texturing, lighting, and other post-clipping threads) have higher priority than the clip thread, which, in turn, has a higher priority than the transform threads that perform initial processing operations. At the second level, within the categories of threads (i.e. lighting threads, transform threads, etc) operation codes corresponding to vertices that have been in the pipeline the longest have highest priority. In other words, the application specific prioritization scheme prioritizes operation codes for a first input data set over operation codes for a second input data set, wherein the first input data set is received for processing prior to the second input data set. This overall prioritization scheme corresponds to the "pulling" of vertices through the pipeline described above, where such prioritization ensures high throughput and low latency within the processing pipeline for each vertex processed.

The method then proceeds to steps 156 and 158, where these steps may be performed in parallel. At step 156 the remaining operation codes are shifted to a subsequent clock cycle of the computation engine (i.e. their execution is not initiated, and they will be considered for execution during the following clock cycle). At step 158 the priority operation code is provided to the computation engine for processing during the present clock cycle. After steps 156 and 158, the method proceeds to step 150.

FIG. 6 illustrates a flow diagram of another method for arbitrating access to a computation engine of a geometric engine that may be used in a video graphics circuit. The method begins at step 160, where the thread controllers only provide operation codes to the arbitration module that may be executed without latency order contention (i.e. operation codes that are not going to have to wait for the latency associated with the execution of other operation codes to be satisfied). Each of the thread controllers is responsible for understanding the dependencies amongst operation codes as well as the latencies associated with the execution of operation codes included in their respective thread. As such, the thread controllers can control the time at which various operation codes are issued to make sure that, for dependent operation codes, the latency requirements of any operation codes upon which the dependent operation codes depend are satisfied. As stated above, each thread controller may only have one operation code pending at any one time. The thread controller receives notification when execution of its pending operation code commences. Based on this notification, and possibly the understood latency associated with the operation code that just began executing, the thread controller can determine when to submit another operation code for execution.

For example, assume that the first operation code submitted by a thread controller corresponds to an operation that adds operands A and B and stores the result in memory location M1, and the second operation code to be submitted combines the value in M1 with a constant C1 and stores this result in memory location M2. The second operation depends on the first operation, and therefore the second operation should not commence execution until the first operation has completed (and the result of A+B is stored in M1). In order to ensure that no stalling of the circuitry occurs due to the execution of the second operation having to wait for the value to be stored in M1, the thread controller waits a time period after it receives an indication that the first operation code has commenced execution before the thread controller submits the second operation code. The time period that the thread controller waits is based on the expected latency associated with the first operation code. For example, if it will take 8 clock cycles for the first operation code to complete execution, the thread controller will wait 8 clock cycles after it receives notification that the first command code has begun executing before it submits the second command code for execution.

The method proceeds from step 160 to step 162. At step 162, an arbitration module determines whether at least one operation code is pending for a given cycle of the computation engine. If not, the method proceeds to step 164 where the given clock cycle is skipped. The method proceeds from step 164 to step 166. At step 166 the method advances to the next clock cycle then proceeds to the determination step 162.

When it is determined at step 162 that at least one operation code is pending, the method proceeds to step 168. At step 168, a priority operation code is determined from the at least one pending operation code based on an application specific prioritization scheme. Step 168 is similar to step 154 of FIG. 5. Following step 168, the method proceeds to step 170. At step 170, the priority operation code is provided to the computation engine for processing. Following step 170, the method proceeds to step 166.

FIG. 7 illustrates a graphical representation of prioritization of operation codes in accordance with a particular embodiment of the present invention. As shown, four thread controllers are each processing a corresponding thread of an application. The application may be a predetermined application that is regularly repeated, at least in part, for various sets of input data received. For example, if the application corresponds to processing geometric primitives in accordance with the OpenGL specification as used in a video graphics circuit, the input data may correspond to vertex data for primitives to be processed.

In the example illustrated, the thread for thread controller 1 (i.e. thread 1) includes operation codes "op1" and "op2". The A designation in the corresponding blocks indicates that the operations correspond to a first vertex, vertex "A". Thus, following the corresponding line for thread controller 1, at cycle 0 (C0 on the timeline), the thread controller 1 issues the operation code op1 for processing vertex A (hence, the designation Aop1).

During cycle C2, thread controller 1 issues Aop2, which corresponds to operation code 2 of the application, where the vertex to be processed is still vertex A. The delay between the issuance of the first operation code (Aop1) and the issuance of the second operation code (Aop2) indicates a dependency between the operation codes. The wait period 200 may be inserted between the operation codes Aop1 and Aop2 to ensure that the latency associated with the execution of Aop1 has been satisfied before Aop2 is initiated.

As shown, after operation codes op1 and op2 have been issued and executed (where execution is indicated by an "X" under the operation code executed for a particular cycle) for vertex A, the thread controller 1 issues operation codes op1 and op2 for the next vertex to be processed, which in this example, is vertex C (vertex B is being processed by thread 2). It should be noted that a similar wait period as that described above for vertex A is inserted between the issuance of operation codes op1 and op2 for vertex C.

Each of the other thread controllers issues command codes corresponding to its respective thread. Thread controller 2 controls a thread that also includes operation codes op1 and op2. Threads 1 and 2 may correspond to transform threads, where each transform thread performs the same operations. A vertex distribution block may be included in the circuit to provide the first vertex (vertex A) to the first transform thread controller (thread controller 1) and the second vertex (vertex B) to the second transform thread controller (thread controller 2). When a transform thread controller finishes processing a vertex, the vertex distribution block may provide that thread controller with the next vertex to be processed. This occurs for vertex C with respect to thread controller 1 when it finishes processing vertex A, and also occurs with respect to thread controller 2 when it finishes processing vertex B.

Thread controller 3 controls a thread that includes operations op3 and op4, where op4 may have some dependency on op3. Dependency between threads may also exist. For example, thread controller 3 may not issue operation code op3 for a vertex until the operation code op2 has begun executing for that vertex. Thus, thread 3 is dependent on the completion of either thread 1 or 2 with regard to each vertex. Note that dependency between threads or operation codes are typically such that the dependent thread or operation code must wait for completion of the thread or operation code upon which it depends. FIG. 7 does not illustrate this type of dependency, but rather indicates dependency based on initiation of execution of an operation code or a final operation code in a thread.

Thread controller 4 manages a thread that includes operations op5, op6, and op7, wherein op6 is dependent on op5, and op5 has an associated latency of five clock cycles. Furthermore, operation code op5 is dependent on the completion of operation code op3 of thread 3. However, op5 is not dependent on completion of op4.

FIG. 7 also illustrates a prioritization scheme that indicates a first level of prioritization. As is shown, thread 4 has the highest priority. Based on the discussion presented above, thread 4 may correspond to post-clip processing operations for vertices of a primitive. Thus, the operations performed by thread 4 may result in final result data that is passed downstream to other circuitry and therefore represents the completion of processing for vertices of a primitive. Threads 1 and 2, which may correspond to transform operations on a vertex (initial processing of a vertex), have the lowest priority. Within each level of the priority scheme, additional priority may be given to vertices that have been in the processing pipeline for the greatest length of time. In other words, if two thread controllers were to share a priority level and both had operation codes pending, the operation code corresponding to the vertex that had been in the pipeline longer would be given priority.

In the example illustrated, it is assumed that the vertex data is just beginning to flow into the pipeline for processing. As, when the vertex data for vertex A, the only operation code that can be executed is op1. Assuming that thread controller 1 is selected as being responsible for executing operation codes op1 and op2 for vertex A, thread controller 1 submits Aop1 for execution during cycle C0. Although thread controller 1 has the lowest priority, Aop1 is selected for execution. This is because there are no other higher-priority operation codes currently pending.

Thread controller 1 must wait for the latency requirements associated with Aop1 to be satisfied before Aop2 can be submitted for processing. As such, Aop2 is not submitted by thread controller 1 until cycle C2. Because all of the other operation codes to be executed for vertex A depend (either directly or indirectly) on op2 completing for vertex A, no other operation codes are submitted for processing by the other thread controllers during cycles C1 and C2 for vertex A. However, vertex B has been received and thread controller 2 is able to submit operation code Bop1 for processing during cycle C1. Bop1 is selected for execution during C1 as it is the only operation code pending.

During cycle C2, operation code Aop2 is the only operation code pending, and, as such it is selected for execution during this cycle. Because op2 has begun executing for vertex A during cycle C3, thread controller 3 may now submit operation code op3 (which is dependent on op2) for execution. Thread controller 1 has moved on to vertex C during cycle C3, and Cop1 has been submitted by thread controller 1 during C3. The latency requirements for Bop1 have also been met by cycle C3, and as such, thread controller 2 has submitted Bop2 for execution. Thus, the arbiter can select from operation codes Cop1, Bop2, and Aop3 during cycle C3. Because thread 3 has the highest priority, Aop3 is selected for execution, and Cop1 and Bop2 remain pending.

As stated above, operation code op5 is dependent on the initiation of execution of operation code op3. As such, during cycle C4, thread controller 4 submits operation code Aop5 for execution. As is illustrated, many operation codes are pending execution during cycle C4. Because thread 4 has the highest priority, Aop5 is selected for execution during cycle C4.

During cycle C5, thread controller 4 cannot submit operation code Aop6 for execution because of the dependency of Aop6 on Aop5, where there is a latency associated with Aop5 that must be met before Aop6 can be submitted. Once the wait period 201 has been satisfied (i.e. in cycle 9), operation code Aop6 can be submitted. As such, operation code Aop4 is selected for execution during cycle C5, as it is the highest priority operation code pending.

During cycle C6, the only operation codes pending are Cop1 and Bop2. Although threads 1 and 2 are of equal priority (the lowest), vertex B has been in the processing pipeline longer than vertex C (op1 has already been executed for vertex B, but hasn't for vertex C). As such, Bop2 is selected as the operation code to be executed during cycle C6.

The selection of the operation code to be executed in the remaining cycles illustrated occurs based on the prioritization scheme as described above. Note that in cycle C12, Cop1 is selected over Dop1 because the Cop1 has been pending execution longer than Dop1. Although the example illustrated may be greatly simplified in comparison with actual systems, it should be understood that it has been provided to clarify the arbitration techniques that allow the multi-thread processing systems described herein to operate in a manner that ensures both high-throughput and low latency.

The preceding discussion has presented a method and apparatus for producing a hardware geometric engine with limited memory requirements, which, as a result, is practical to implement. Memory contention is eliminated with the use of a highly efficient pipeline architecture that includes memory along each of the data paths in the system. An arbitration scheme is used to control the execution of operation codes corresponding to a plurality of threads, such that data throughput is high and latency is low. With these and other optimization described herein, the hardware geometric engine may be commercially realized without the limitations associated with the serial processing of graphics primitives in prior art systems.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computation module comprises:

memory;

a computation engine operable to perform an operation based on an operation code and to provide a corresponding result to the memory as indicated by the operation code;

a plurality of thread controllers, wherein each of the plurality of thread controllers manages at least one corresponding thread of a plurality of threads, wherein the plurality of threads constitutes an application, and wherein each of the plurality of threads includes at least one operation code; and an arbitration module operably coupled to the plurality of thread controllers, wherein the arbitration module utilizes an application specific prioritization scheme to provide operation codes from the plurality of thread controllers to the computation engine in an order to minimize idle time of the computation engine.

2. The computation module of claim 1, wherein at least one of the plurality of threads is dependent upon at least one other thread of the plurality of threads and wherein the application specific prioritization scheme prioritizes the at least one other thread over the at least one of the plurality of threads.

3. The computation module of claim 1, wherein each operation code includes a controller identity, a type of operation, a first source address, a second source address, and a destination address, wherein the computation engine performs the operation using data stored at the first and second source addresses, wherein each of the plurality of thread controllers maintains latency data for operation codes of a corresponding thread, and wherein each of the plurality of thread controllers releases operation codes to the arbitration module in accordance with the latency data.

4. The computation module of claim 1, wherein the computation engine further comprises a vector engine that performs the operation as a vector operation.

5. The computation module of claim 4, wherein the vector operation includes at least one of: a vector dot product operation, a vector multiplication operation, a vector multiply and accumulate operation, a vector addition operation, and a vector subtraction operation.

6. The computation module of claim 1, wherein the plurality of thread controllers includes at least one of: a transform thread controller, a clip thread controller, a barycentric controller, and an attribute thread controller.

7. The computation engine of claim 1, wherein each thread of the plurality of threads includes a sequence of operation codes corresponding to a predetermined portion of the application.

8. The computation engine of claim 1, wherein the application includes processing graphics primitives.

9. A geometric engine for use in a video graphics controller, the geometric engine comprises:

a vector engine operably coupled to perform an operation upon data as indicated by an operation code, wherein the operation code includes at least one source address, a destination address, and an operation type that indicates the operation to be performed;

a transform controller operably coupled to manage a transform thread, wherein the transform thread includes a set of transform operation codes, wherein when the transform operation codes are executed, the vertex data corresponding to an initial set of vertices of a primitive are rotated from an initial coordinate system into a different coordinate system to produce rotated vertex data for the primitive;

a clip controller operably coupled to manage a clip thread, wherein the clip thread includes a set of clip operation codes, wherein when the clip operation codes are executed, a determination is made as to whether at least a portion of the primitive lies within a clip volume based on the rotated vertex data, wherein when at least a portion of the primitive lies within the clip volume and at least a portion of the rotated vertex data corresponding to at least one vertex of the primitive lies outside of the clip volume, new vertex data is calculated for the at least one vertex;

a plurality of attribute controllers, wherein each attribute controller of the plurality of attribute controllers is operably coupled to manage a corresponding attribute thread, wherein each of the corresponding attribute threads includes a set of attribute operation codes, wherein when executed, each set of attribute operation codes determines an attribute for the vertex data corresponding to the initial set of vertices;

a barycentric controller operably coupled to manage a barycentric thread, wherein the barycentric thread includes a set of barycentric operation codes, wherein, when executed, the barycentric operation codes combine the attributes produced by the plurality of attribute controllers with the new vertex data to produce adjusted attributes for the primitive; and an arbitration module operably coupled to provide the operation code to the vector engine, wherein the arbitration module selects the operation code from pending operation codes issued for execution by the transform controller, the clip controller, the plurality of attribute controllers, and the barycentric controller, wherein the arbitration module selects the operation code from the pending operation codes based on a prioritization scheme.

10. The geometric engine of claim 9, wherein attribute command codes are not submitted for execution by the plurality of attribute controllers when the clip controller determines that no portion of the primitive lies within the clip volume.

11. The geometric engine of claim 9, wherein the different coordinate system to which the vertex data is rotated includes at least one of a clip coordinate system and an eye coordinate system.

12. The geometric engine of claim 9, wherein the barycentric operation codes in the barycentric thread utilize barycentric coordinate values to produce the adjusted attributes for the primitive, wherein the barycentric coordinate values are generated by the clip operation codes as part of the new vertex data.

13. The geometric engine of claim 9, wherein the transform controller further comprises a first transform controller, a second transform controller, and a third transform controller, wherein the first transform controller manages a first transform thread that produces a first portion of the rotated vertex data, wherein the second transform controller manages a second transform thread that produces second portion of the rotated vertex data, and wherein the third transform controller manages a third transform thread that produces a third portion of the rotated vertex data.

14. The geometric engine of claim 13, wherein the clip thread further comprises, within the set of clip operation codes, operation codes that, when executed, determine whether at least one of the first, the second, and the third rotated vertex data is within the clip volume.

15. The geometric engine of claim 9, wherein the plurality of attribute controllers further comprises a first set of attribute controllers, a second set of attribute controllers, and a third set of attribute controllers, wherein each attribute controller of the first set of attribute controllers manages a first set of attributes thread that produces a first set of attributes for a first vertex of the primitive, wherein each attribute controller of the second set of attribute controllers manages a second set of attributes thread that produces a second set of attributes for a second vertex of the primitive, and wherein each attribute thread of the third set of attribute controllers manages a third set of attributes thread that produces a third set of attributes for a third vertex of the object.

16. The geometric engine of claim 9, wherein the attributes determined by attribute operation codes include linearly interpolated attributes.

17. The geometric engine of claim 16, wherein the linearly interpolated attributes include at least one of colors and textures.

18. The geometric engine of claim 9 further comprises:
a scalar engine operably coupled to perform a scalar operation upon data as indicated by a scalar operation code, wherein the scalar operation code is determined based on the operation code selected by the arbitration module.

* * * * *